(12) United States Patent
Thompson

(10) Patent No.: US 8,844,750 B1
(45) Date of Patent: Sep. 30, 2014

(54) HINGELESS DOOR SYSTEM FOR PRESSURE VESSELS

(71) Applicant: Arthur Richard Daniel Thompson, Palmadale, CA (US)

(72) Inventor: Arthur Richard Daniel Thompson, Palmadale, CA (US)

(*) Notice: Subject to any disclaimer, the term of this patent is extended or adjusted under 35 U.S.C. 154(b) by 0 days.

(21) Appl. No.: 13/826,948

(22) Filed: Mar. 14, 2013

(51) Int. Cl.
B65D 43/04 (2006.01)
B65D 43/08 (2006.01)
B65D 43/12 (2006.01)
B65D 51/14 (2006.01)
B65D 53/04 (2006.01)
B64G 1/22 (2006.01)
E06B 7/16 (2006.01)
B64C 1/14 (2006.01)

(52) U.S. Cl.
CPC .............. B64C 1/1461 (2013.01); B64G 1/22 (2013.01); E06B 7/16 (2013.01)
USPC .................. 220/345.6; 220/345.1; 220/345.2; 220/351; 220/203.1; 220/213; 220/240; 220/242; 220/790; 220/316; 220/801; 244/140; 244/129.5

(58) Field of Classification Search
USPC .......... 220/345.6, 345.1, 345.2, 351, 203.01, 220/213, 240, 252, 790, 316, 801; 244/140, 244/129.5
See application file for complete search history.

(56) References Cited

U.S. PATENT DOCUMENTS

| 643,949 | A | * | 2/1900 | Deane | 422/296 |
|---|---|---|---|---|---|
| 1,488,801 | A | * | 4/1924 | Albanese | 220/213 |
| 1,523,939 | A | * | 1/1925 | Evans | 220/315 |
| 2,447,464 | A | | 8/1948 | Jenkins | |
| 2,986,361 | A | | 7/1959 | Codding | |
| 3,623,627 | A | | 11/1971 | Bolton | |
| 4,277,855 | A | | 7/1981 | Poss | |
| 5,297,761 | A | | 3/1994 | Kendall, Jr. et al. | |
| 5,507,408 | A | * | 4/1996 | Mosior et al. | 220/345.2 |
| 5,540,404 | A | * | 7/1996 | Battenfield | 244/129.5 |
| 5,702,307 | A | | 12/1997 | Moran | |
| 6,105,805 | A | * | 8/2000 | Labelle et al. | 220/262 |
| 6,206,227 | B1 | | 3/2001 | Ferri, Jr. | |
| 6,352,078 | B1 | | 3/2002 | Harvey et al. | |
| 6,629,896 | B2 | | 10/2003 | Jones | |
| 7,753,442 | B2 | | 7/2010 | Liberkowski | |
| 7,922,029 | B1 | * | 4/2011 | Aretz et al. | 220/661 |
| 8,047,473 | B2 | | 11/2011 | Johnson | |
| 2004/0262314 | A1 | | 12/2004 | Weatherhead | |
| 2006/0086735 | A1 | | 4/2006 | Weerth | |

* cited by examiner

Primary Examiner — Fenn Mathew
Assistant Examiner — Jennifer Castriotta
(74) Attorney, Agent, or Firm — Howard Leslie Hoffenberg; Law Offices of Howard L. Hoffenberg, Esq.

(57) ABSTRACT

A hingeless door system for a pressure vessel; especially, aeronautic and astronautic crafts. The door system has the following major components: a contour in a pressure vessel wall, a doorway opening, a seal, an upper track, a lower track and a door. The door translocates laterally along the tracks from an open position to a closed position and moves radially along the tracks to a sealed position against the contour which closes the door opening. The problem solved by the invention is to reduce weight, operational volume and complexity and increase durability of a door system for a pressure vessel.

34 Claims, 19 Drawing Sheets

HINGELESS DOOR SYSTEM FOR PRESSURE VESSELS

BACKGROUND OF THE INVENTION

1. Field of the Invention

This invention pertains generally to aeronautic and astronautic craft structure and more particularly to doors.

2. Related Art

Human beings have taken to the skies and outer space in aeronautic and astronautic crafts. These crafts encounter a lowering of atmospheric pressure and breathable air for human occupants as altitude increases. Ultimately, in outer space, there is a near perfect vacuum with virtually no atmospheric pressure and no breathable air.

Aeronautic and astronautic crafts can be designed to adapt to this lowering of atmospheric pressure with an arrangement that seals the internal space of the craft from the external environment and that creates an internal pressure greater than the external pressure. With a sufficient internal pressure, there is breathable air for human occupants. Accordingly, aeronautic and astronautic crafts are generically referred to as pressure vessels. A pressure vessel has a finite and limited internal volume.

Pressure vessels have a lift system that overcomes the force of gravity. This lift system typically is powered by an internal combustion engine, turboprop engine, jet engine, rocket engine, buoyancy of a hot air balloon or buoyancy of a helium balloon. The lift system has a finite and limited lift capability. This finite and limited lift capability in turn imposes a maximum weight capacity for the pressure vessel.

Pressure vessels have one or more doors that open and close so that human occupants (and things) can enter and leave the pressure vessel. Typically, these doors have hinges, latches, locking devices and other hardware. The door related hardware disadvantageously adds weight to the pressure vessel which must be overcome by the lift system. Accordingly, the weight of door hardware competes for an allocation of weight capacity with equipment, instrumentation, cargo and/or occupants being on board the pressure vessel.

The door requires a free area within the pressure vessel for operation; typically, a free area in which to swing in and out. This free area for operation disadvantageous competes for an allocation of internal volume with equipment, instrumentation, cargo and/or occupants being on board the pressure vessel.

United States Patent Publication US2004/0262314 A1 by Weatherhead et al. teaches a hatch cover apparatus for a container. The hatch cover apparatus is comprised of a lid adapted to cover an opening. The lid is mounted to collars that slidingly run along parallel cylinder rails. The apparatus includes an expandable seal positioned between the lid and the container and an arrangement for retaining the cover lid in a closed position when the seal is expanded. This apparatus has the disadvantage of added weight from the hardware that makes up the sliding and retaining arrangement. The apparatus has the disadvantages of an expandable seal which adds complexity and risk of failure. The hatch cover apparatus is not aerodynamic and poorly suited for pressure vessels.

United States Patent Publication US2006/0086735 A1 by Weerth teaches a spherical blast resistant container. The container has a non-circular (e.g., elliptical) doorway opening and an oversized hatch. The oversized hatch is fitted on an angle through the doorway opening. The hatch is manipulated parallel to the doorway opening. The container becomes pressurized by an explosive detonation. When this occurs, the greater surface area of the hatch presses against the inside surface of the container wall so as to seal the container. This patent publication has the shortcoming of not teaching a system for laterally translocating the hatch from an open doorway to a closed doorway. It has the disadvantage of requiring the hatch to be a non-circular shape which impedes laterally translocating the hatch.

U.S. Pat. No. 4,277,855 by Poss teaches a skylight that moves radially from a closed to open position for ventilation. The skylight is comprised of a dome that is mounted to a sleeve that is received in an opening in a curved wall. The sleeve slides radially within the opening to lift the skylight dome to an upper ventilating position. The dome lowers to engage a weather stripping within a recess. This skylight system is not a door with the utility of an opening through which human occupants (and things) can enter and leave.

There is a need for a pressure vessel door system which reduces and/or eliminates the addition of weight to the pressure vessel by hinges, latches, locking devices and/or other hardware. There exists a need for a pressure vessel door system that is lightweight compared to the state of the art.

There is a need for a pressure vessel door system which does not take-up internal volume for swing-in and swing-out. There is a need for a pressure vessel door system that has a small operational volume compared to the state of the art.

There is a need for a pressure vessel door system that satisfies the above needs for limited weight and operational space where the door is not left free and unsupported to be lifted and removed in and out place.

There is a need for a pressure vessel door system that satisfies the above needs for limited weight and operational space where opening and closing/sealing the door is not time consuming.

There is a need for a pressure vessel door system that satisfies the above needs for limited weight and operational space which is simple to construct, operate and maintain.

There is a need for a pressure vessel door system that satisfies the above needs for limited weight and operational space which is inexpensive to construct, operate and maintain.

There is a need for a pressure vessel door system that satisfies the above needs for limited weight and operational space which is strong, tough, resistant to rupture, resistant to strain and resistant to failure.

The present invention satisfies these needs, as well as others, and generally overcomes the presently known deficiencies in the art.

SUMMARY OF THE INVENTION

The present invention is directed to a hingeless door system for a pressure vessel.

An object of the present invention is a pressure vessel door system which reduces and/or eliminates the addition of weight to the pressure vessel by hinges, latches, locking devices and/or other hardware. A further object of the invention is a pressure vessel door system that is lightweight compared to the state of the art.

An object of the present invention is a pressure vessel door system which operates without taking up volume for swing-in and swing-out. A further object of the present invention is a pressure vessel door system that has a small operational volume compared to the state of the art.

An object of the present invention is a pressure vessel door system that achieves the objectives of limited weight and operational space where the door is not left free and unsupported to be lifted and removed in and out place.

An object of the present invention is a pressure vessel door system that that achieves the objectives of limited weight and operational space where opening and closing/sealing the door is not time consuming.

An object of the present invention is a pressure vessel door system that that achieves the objectives of limited weight and operational space which is simple to construct, operate and maintain.

An object of the present invention is a pressure vessel door system that achieves the objectives of limited weight and operational space which is inexpensive to construct, operate and maintain.

An object of the present invention is a pressure vessel door system that satisfies the above needs for limited weight and operational space which is strong, tough, resistant to rupture, resistant to strain and resistant to failure.

One aspect of the present invention is a hingeless door system for a pressure vessel having a wall that partitions a pressurizable internal space from an external environment. There is a contour in the wall on the internal side of the vessel that forms a retaining surface capable of conformingly receiving an exterior surface of a door. A doorway opening goes through the retaining surface and wall to allow for passage between the internal space and the external environment.

A pair of spaced apart, oppositely opposed tracks are mounted to the vessel in tangential proximity to the doorway opening. The tracks have an inner guide wall, a running surface which mates to the inner guide wall with a section of said running surface opposite the doorway opening adapted to extend outward to approximately flush with the retaining surface such that a door can move radial on the outward extension between a sealed position and an unsealed position. The track is of sufficient length such that a door can move transversely between an unsealed position and an ingressable-egressable position.

There is a door that has an exterior surface that conforms to the retaining surface, an outer edge and has one or more members with the capability of running along the running surfaces and moving radially on the running surface extensions that is movably mounted between the running surfaces on the opposing tracks. A seal is mounted on the retaining surface that circumscribes the doorway opening and/or on the exterior surface of the door delimited by the outer edge. The door with the assistance of the seal is capable of forming an airtight engagement with the retaining surface.

Another aspect of the present invention is a hingeless door kit for a pressure vessel. The kit has a first track having a guide wall which mates to a running surface with a section of said running surface being adapted to be approximately flushable with contour of a retaining surface where the track is of sufficient length for the movement of a door running along said surface from an unsealed door openable position and an ingressable-egressable position. The kit has a second track having a guide wall which mates to a running surface with a section of said running surface being adapted to be approximately flushable with a contour of a retaining surface where the track is of sufficient length for the movement of a door running along said surface from an unsealed door openable position and an ingressable-egressable position.

There is a seal that is configurable to be mounted on a mounting. The mounting is on the retaining surface with a doorway opening so as to circumscribe the doorway opening. Alternatively, the mounting is on the exterior surface of a door with an outer edge so as delimit the outer edge.

The previously described versions of the present invention has many advantages which include no hinge system which in turn reduces the space required for operation and weight of the door system. Other advantages are that the hingeless door system is simple and inexpensive to construct, build, operate and maintain. Other advantages are that the hingeless door system is strong, tough, resistant to rupture, resistant to strain and resistant to failure.

BRIEF DESCRIPTION OF THE DRAWINGS

These and other features, aspects and advantages of the present invention will become better understood with reference to the following description, appended claims and accompanying drawings where:

FIGS. 10A and 10B show the door in closed sealed position, FIG. 10C shows the door in unsealed door operable position, FIGS. 10D-10E show the door running along the running surface and FIG. 10F shows the door in open ingressable-egressable position;

DETAILED DESCRIPTION OF THE INVENTION

Figure 1:
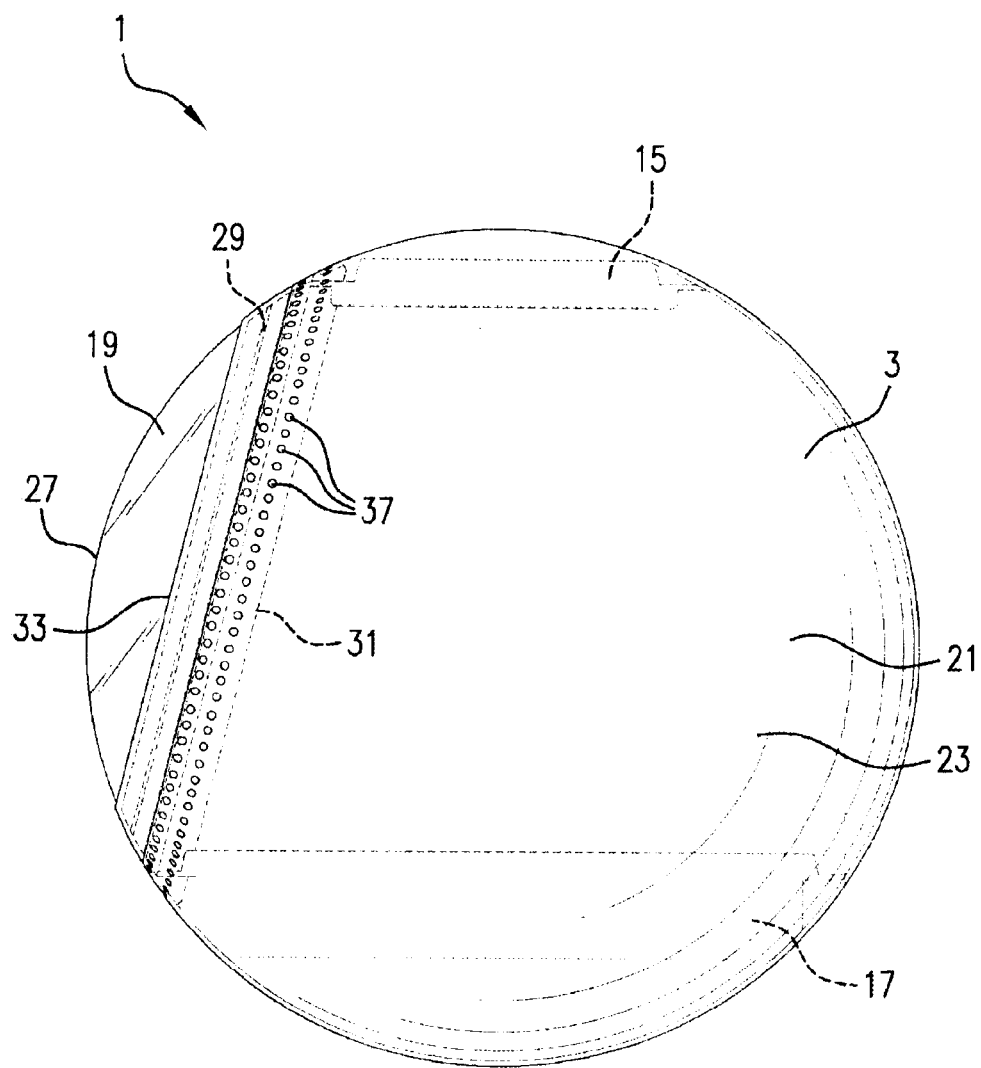
FIG. 1 shows a side view of a pressure vessel having a hingeless door system according to the present invention with the door closed.

The present invention is described more fully in the following disclosure. In this disclosure, there is a discussion of embodiments of the invention and references to the accompanying drawings in which embodiments of the invention are shown. These specific embodiments are provided so that this invention will be understood by those skilled in the art. This invention is not limited to the specific embodiments set forth herein below and in the drawings. The invention is embodied in many different forms and should be construed as such with reference to the appended claims.

Referring to FIG. 1, the invention is directed at hingeless door systems (1) and hingeless door kits for pressure vessels (3). In general terms and for an overview, embodiments of this invention are typically comprised of the following major components or subassemblies: a contour (5) in an internal side of the vessel wall (7), a doorway opening (9), a seal (11, 13), a first and usually upper track (15), a second and usually lower track (17) and a door (19). In the discussion that follows, each of these major components or subassemblies is discussed, along with other structures in the embodiments of this invention. Thereafter, there is a discussion on how to use the invention.

Continuing to refer to FIG. 1, a pressure vessel (3) has a vessel wall (21) that partitions a pressurizable internal space from an external environment. The vessel wall (21) has an external side (23) and an internal side (7). Typically, the vessel wall (21) is either a solid sheathing or of a boxlike configuration with an outer sheathing and an inner sheathing that are each mounted to a framework of central ribs, studs and/or supports. The vessel wall (21) is typically made from metal, usually aluminum; polycarbonate; fiberglass and/or graphite composite polymers. The pressure vessel (3) has a means for providing an internal pressure inside the vessel; for example, injecting or infusing compressed or liquid oxygen and nitrogen. It also has a means for releasing that internal pressure; for example, a cryogenic valve and a pressure relief valve.

Figure 4:
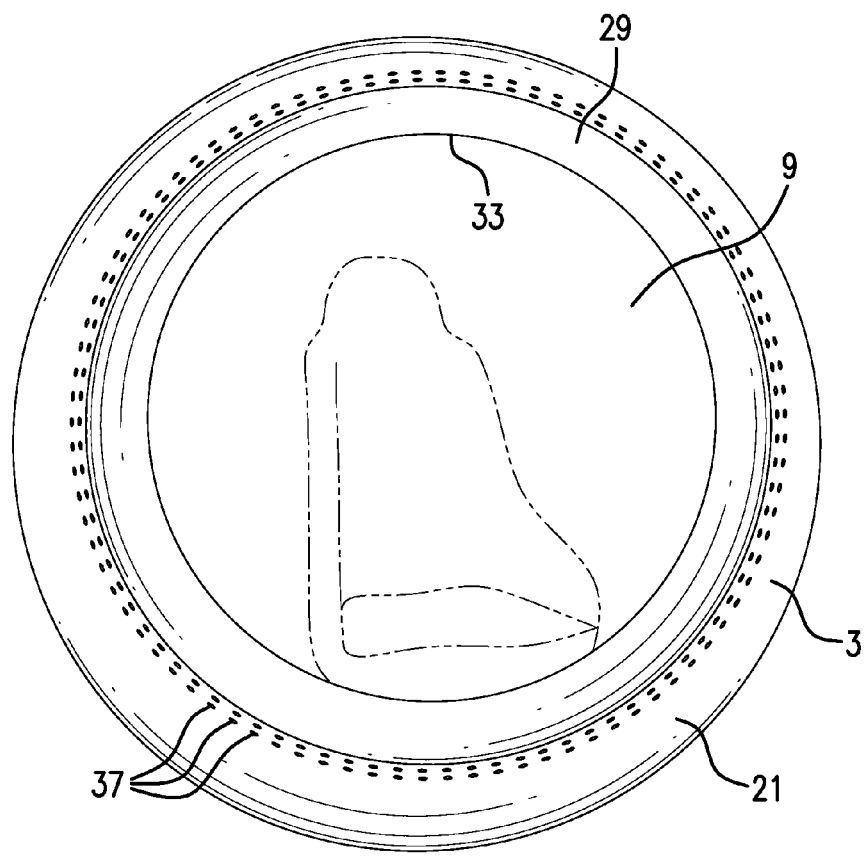
FIG. 4 shows a front perspective view of a pressure vessel with a bezel ring according to the present invention (no door)

Referring to FIG. 4, typically, the pressure vessel (3) is of a size suitable for human occupancy by one or more crew members and zero or more passengers. The pressure vessel is usually configured for utilization as an atmospheric vessel or space vehicle. Examples of pressure vessels are aircraft, space capsules, spaceships, space stations, moon bases and planet bases. A preferred pressure vessel (3) is a hollow spherical container outfitted with accoutrements to be a space capsule as described in Example 1 herein.

Figure 5B:
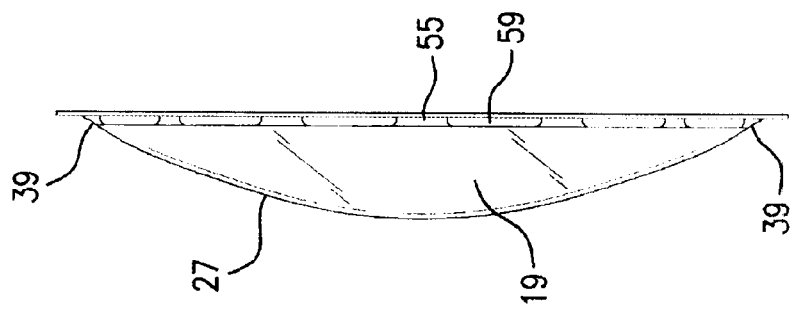
FIG. 5B shows a side view of a door according to the present invention.
Figure 7:
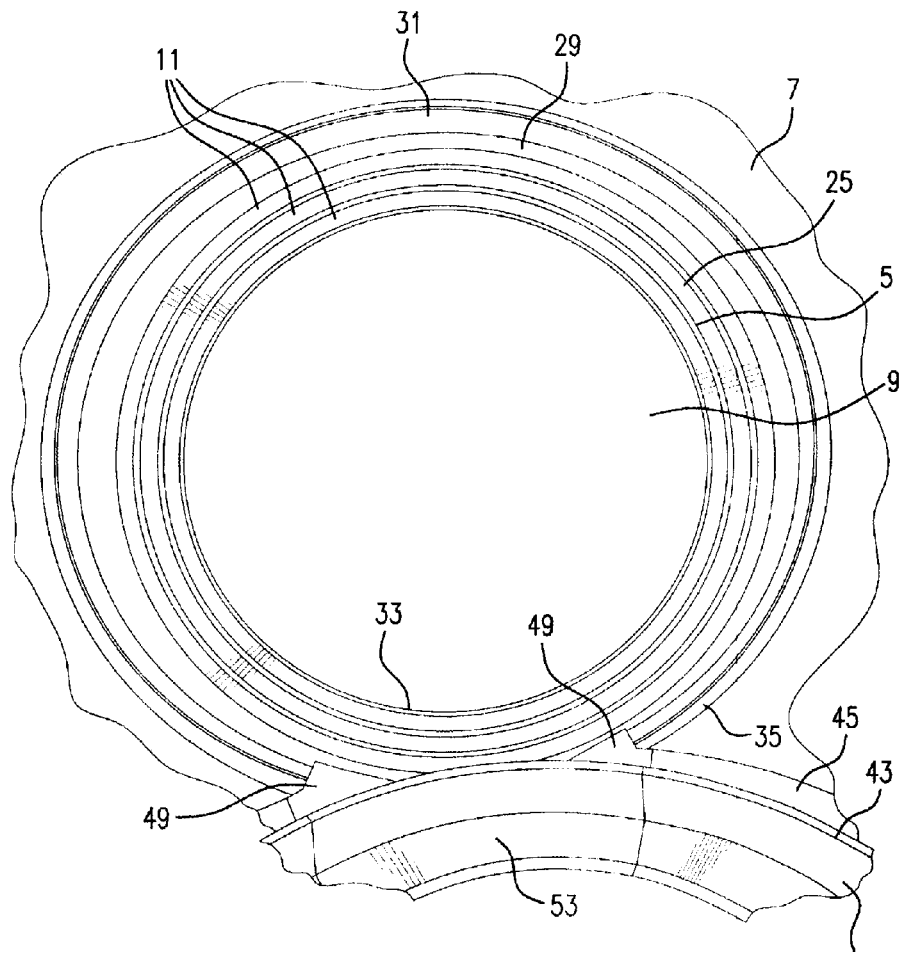
FIG. 7 shows a fragmentary perspective view of a track flushing to a bezel ring according to the present invention.

Referring to FIGS. 5B and 7, there is a contour (5) in the internal side of the vessel wall (7) of the pressure vessel (3) that forms a retaining surface (25) capable of conformingly receiving an exterior surface (27) of a door (19). One Example of the contour (not illustrated) has the spatial attributes of planar recesses with orthogonal lips forming a box frame-like retaining surface. This style contour is suited for square or rectangular doors.

Figure 5A:
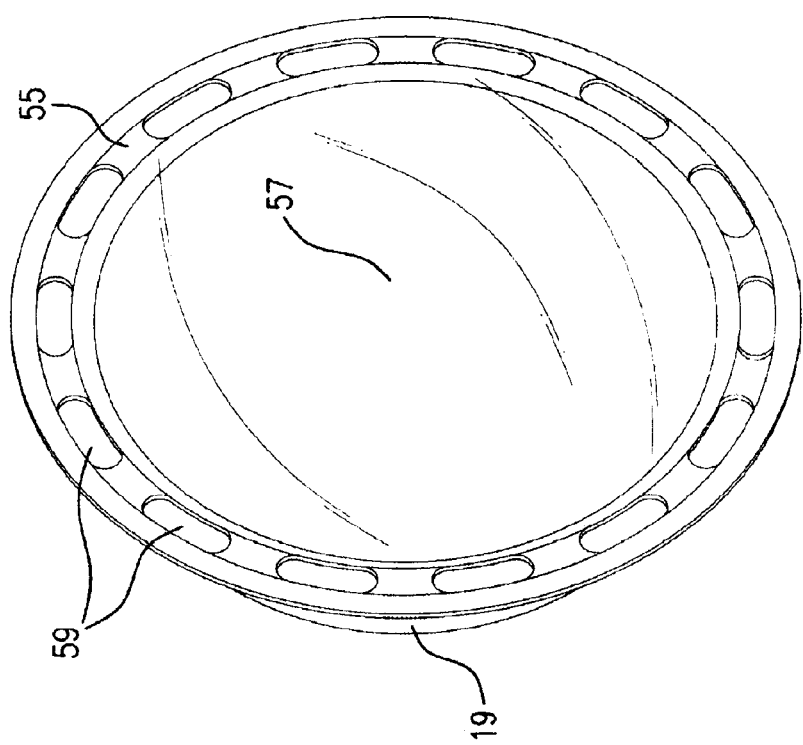
FIG. 5A shows an elevated perspective view from the interior side of a door according to the present invention.

Referring to FIG. 7, a preferred contour (5) has the spatial attributes of concave semispherical or frustaconical to form a retaining surface (25). This contour (5) is capable of conformingly receiving the convex-like exterior surface (27) of a door (19). Referring to FIGS. 5A and 5B, as discussed below, in preferred embodiments, the door (19) is circular with spatial attributes forming a convex semispherical exterior surface.

Referring to FIGS. 4 and 7, there is a doorway opening (9) that goes through the retaining surface (25) and concomitantly the vessel wall (21) to allow for passage between the internal space of the vessel (3) and the external environment. Referring to FIGS. 10A-F, the doorway opening (9) has a surface area that is smaller than and subsumed by the exterior surface of a door (19) such that the door (19) can engage the retaining surface to form an airtight seal over and about the doorway opening (9). The periphery of the doorway opening (9) typically is shaped to be congruently corresponding to the periphery shape of the door (19). This facilitates a mating positioning between the doorway opening (9) and the door (19) which is laterally movable, as explained below. The doorway opening can be formed in or cut out of the retaining surface (25) and vessel wall (21). In a preferred embodiment, the door (19) has a circular shape and the doorway opening is circular (9).

Figure 2:
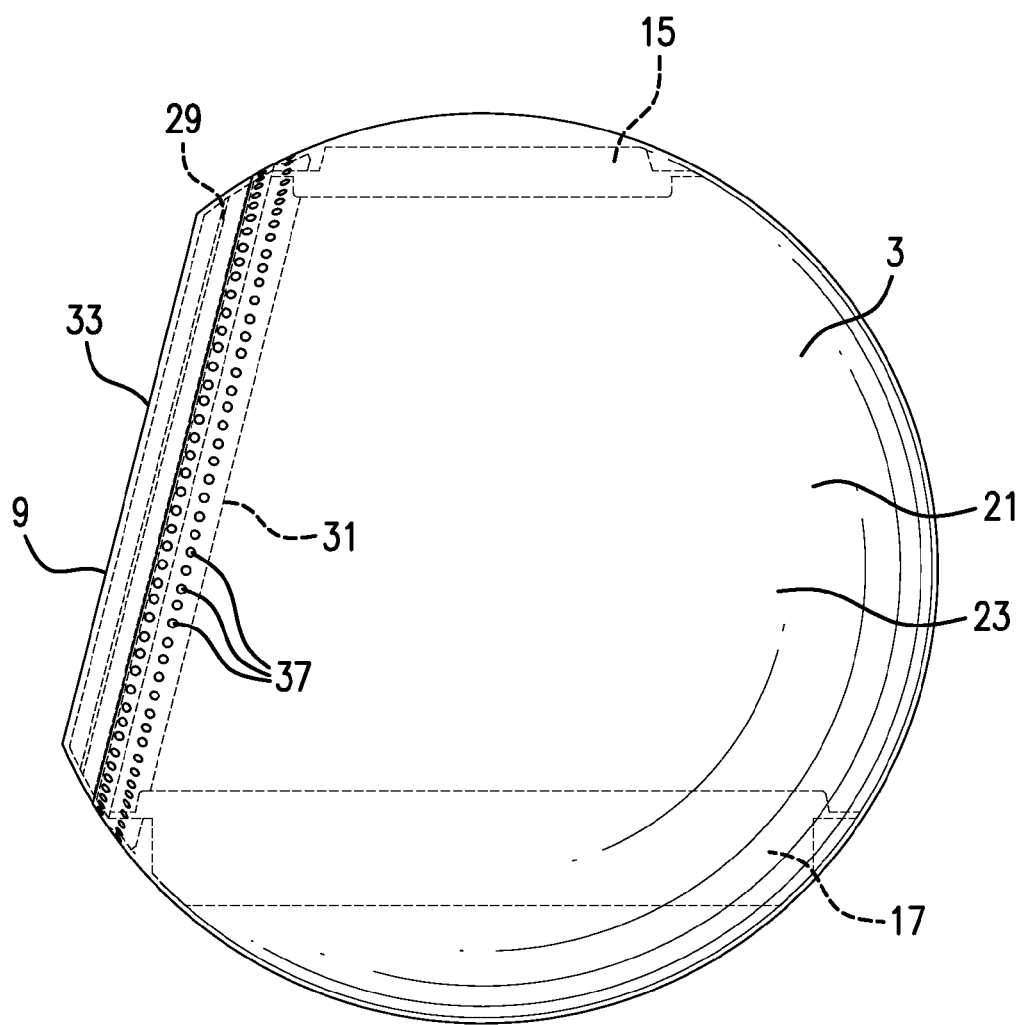
FIG. 2 shows a side view of a pressure vessel having a hingeless door system according to the present invention with no door.
Figure 3:
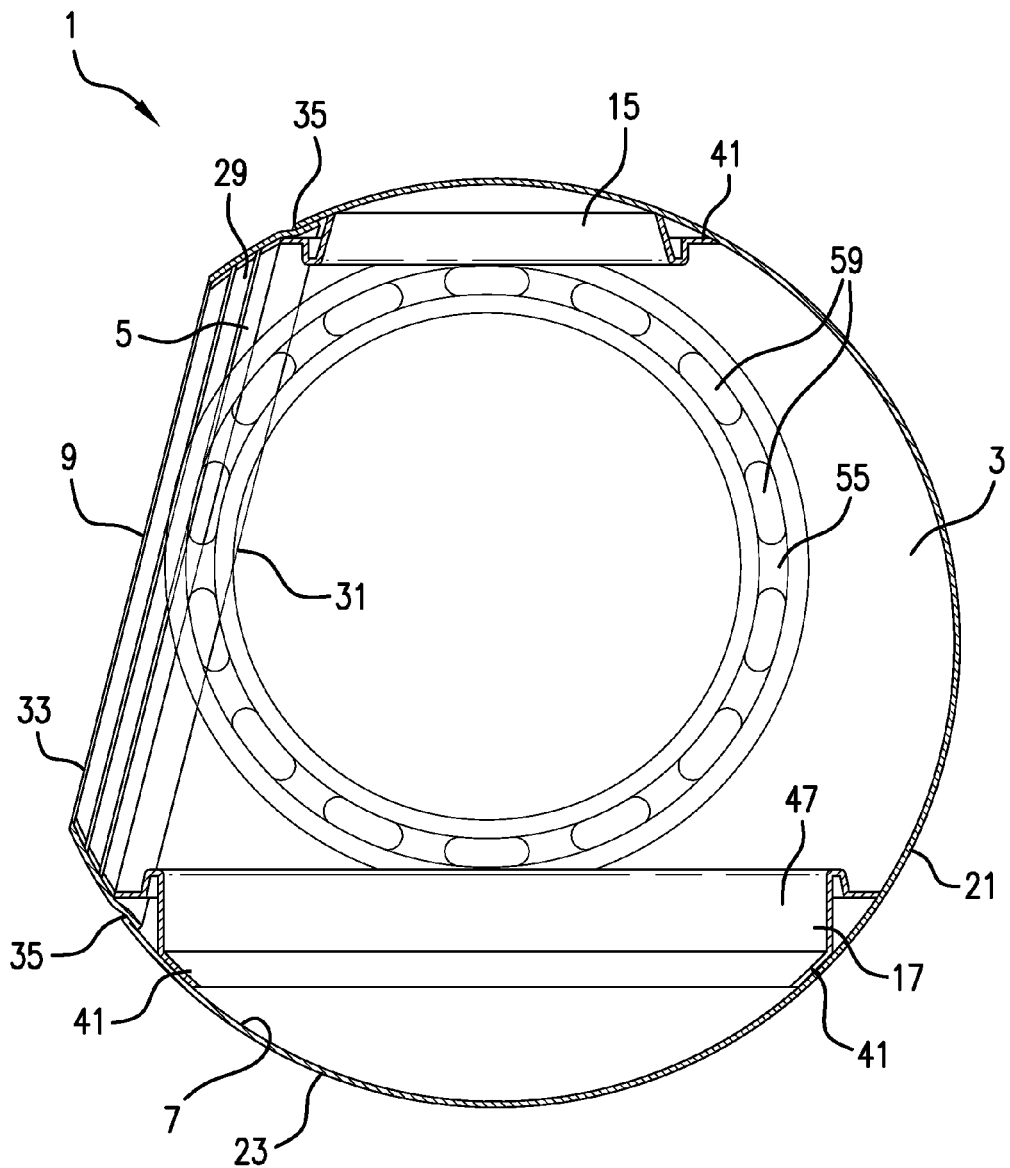
FIG. 3 shows a side view of a pressure vessel having a hingeless door system according to the present invention with the door in an open ingressable-egressable position.

Referring to FIGS. 2 and 3, in a more preferred embodiment of the invention, the contour (5) and doorway opening (9) are constructed using a bezel ring (29). A bezel ring (29) has inner spatial attributes of concave semispherical or frustaconical so as to form a retaining surface (25). Referring to FIGS. 3 and 7, the bezel ring has a major opening (31) and a minor opening (33). Typically, the bezel ring (29) is made from metal, usually aluminum; polycarbonate; fiberglass and/or graphite composite polymers.

Referring to FIGS. 2, 3 and 4, the bezel ring (29) is mounted by way of its major opening (31) to an opening (35) in the pressure vessel wall (21) so as to become a continuous extension of the vessel wall (21). The bezel ring (29) is typically secured using a penetrating fastener such as screws (37). This opening (35) in the pressure vessel wall (21) is large enough to pass a door (19). The bezel ring (29) acts as a size adaptor where the minor opening of the bezel ring (29) is a doorway opening (9) with a surface area less than the surface area of a door (19). Accordingly, the door (19) covers the minor opening of the bezel ring (29) (i.e., the doorway opening) and is hermetically engagable to the inner surface (25) (retaining surface) of the bezel ring (29) for an air tight seal.

Referring FIGS. 3 and 10D-F, the utilization of the bezel ring (29) is an advantageous procedure and means by which to get a door (19) into a pressure vessel (3). A door (19) is slipped through the opening 9 in the pressure vessel wall (21) that is large enough to receive the door (19). After the door (19) is slipped into the pressure vessel (3), the bezel ring (29) is mounted by way of its major opening (31) to the vessel wall opening (35) using for example screws. The bezel ring (29) with its minor opening (33) effectively reduces the size of the vessel wall opening (35) to a size suitable for being a doorway opening (9) that has a surface area smaller than and subsumed by the exterior surface (27) of a door (19) (already in the pressure vessel.) By unscrewing or otherwise unmounting the bezel ring (29), the door (19) can be changed for say in the event that it wears out or becomes damaged. Thereafter, the bezel ring (29) is screwed or otherwise remounted to the vessel wall opening (35).

If no bezel ring (29) is utilized, alternative procedures and/or means for disposing a door (19) within the pressure vessel are another hatch large enough to pass a door, removable panel or panels as a component of the pressure vessel wall (21) through which to pass a door and/or building the vessel wall (21) around a door (19) such that the door (19) is encapsulated as the vessel (3) is built.

Figure 8A:
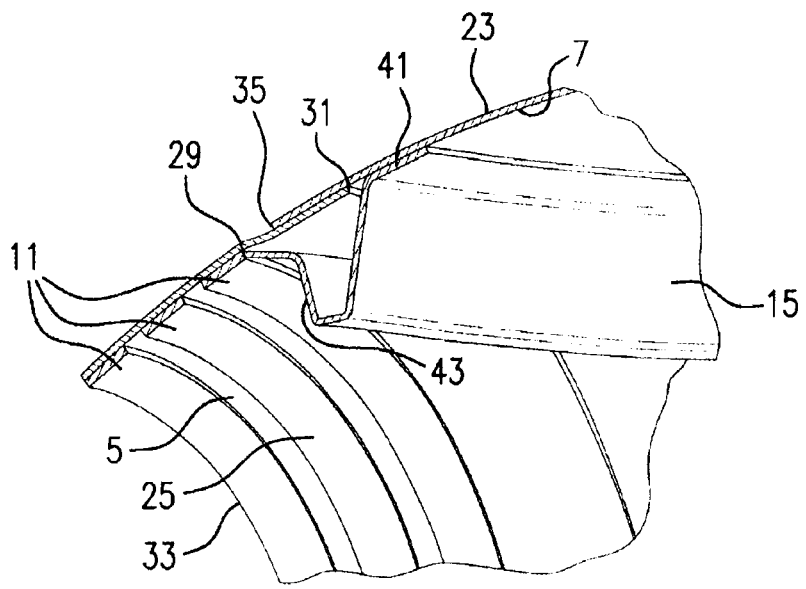
FIG. 8A shows a fragmentary perspective view of an upper track flushing to a bezel ring with strip seals according to the present invention.
Figure 9A:
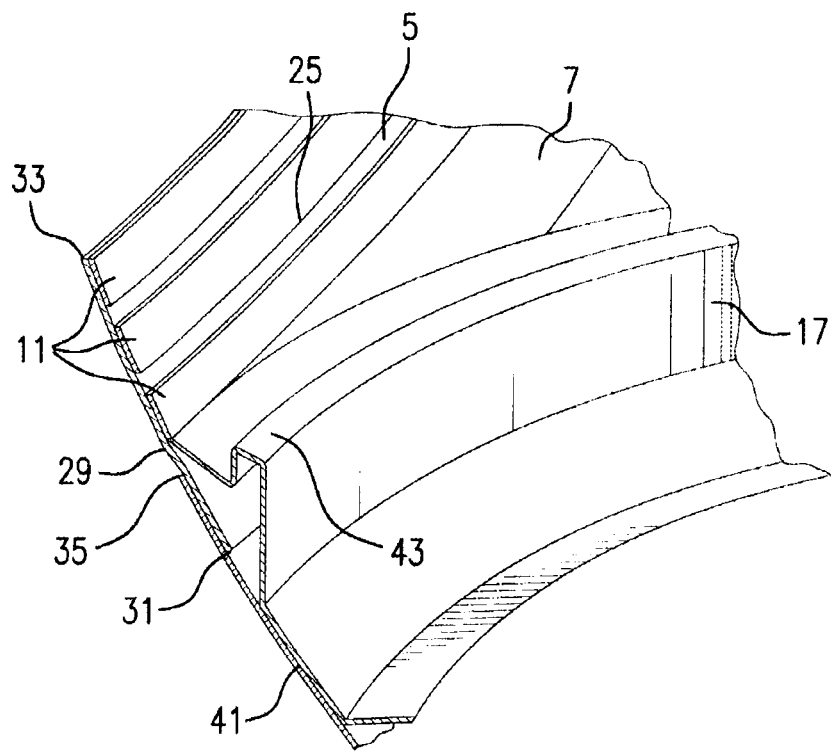
FIG. 9A shows a fragmentary perspective view of a lower track flushing to a bezel ring with strip seals according to the present invention.

Referring to FIGS. 7, 8A and 9A, there is a seal (11, 13) mounted or applied to the retaining surface (25) that circumscribes the doorway opening (9) so as to be capable of forming an airtight engagement of the door with the retaining surface (19). The seal (11, 13) can be a coating, strip, gasket, bead and/or other configuration capable of forming a hermetic junction. In an alternative embodiment, the seal can be mounted or applied to the exterior surface of the door in proximity to the outer edge (39) of the door (19) and delimited by that outer edge (39) (not illustrated.)

The seal is made or formed from a non-porous, soft and deformable material such as natural rubber, synthetic styrene butadiene rubber and silicone. Silicone is a preferred material. A solid seal (11, 13) is mounted to the retaining surface or exterior surface of the door (27) using a liquid boding material, cement and/or silicone glue with silicone glue being preferred. For ease of manufacturing and installation, it is preferred that the seal be comprised of a plurality of segments that are laid head-to-tail. The gap between segments can be filled with a liquid boding material, cement, or silicone seal so that seal (11,13) comprised of a plurality of segments has airtight integrity. A coating seal can be cast or sprayed in its liquid form with a cross-linking agent for curing or applied in a hot liquid form to cool and solidify.

Continuing to refer to FIGS. 7, 8A and 9A, in a preferred embodiment, the seal is a strip seal (11). In a more preferred embodiment, there are a plurality of concentric strip seals (11) mounted on the retaining surface (25) in a spaced apart arrangement that circumscribe the doorway opening (9). One point of contact along a single strip seal (11) circumscribing a doorway opening typically is sufficient for hermetically capturing and retaining the door (19) for a pressurized condition of the pressure vessel (3). Three points of contact provides for fail safe redundant back-up and quicker hermetic engagement.

Figure 8B:
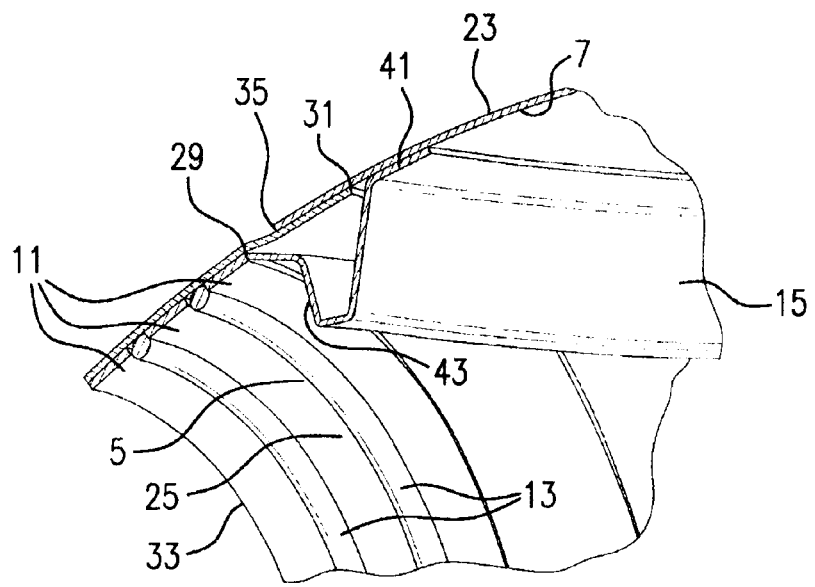
FIG. 8B shows a fragmentary perspective view of an upper track flushing to a bezel ring with strip seals and bead seals according to the present invention.
Figure 9B:
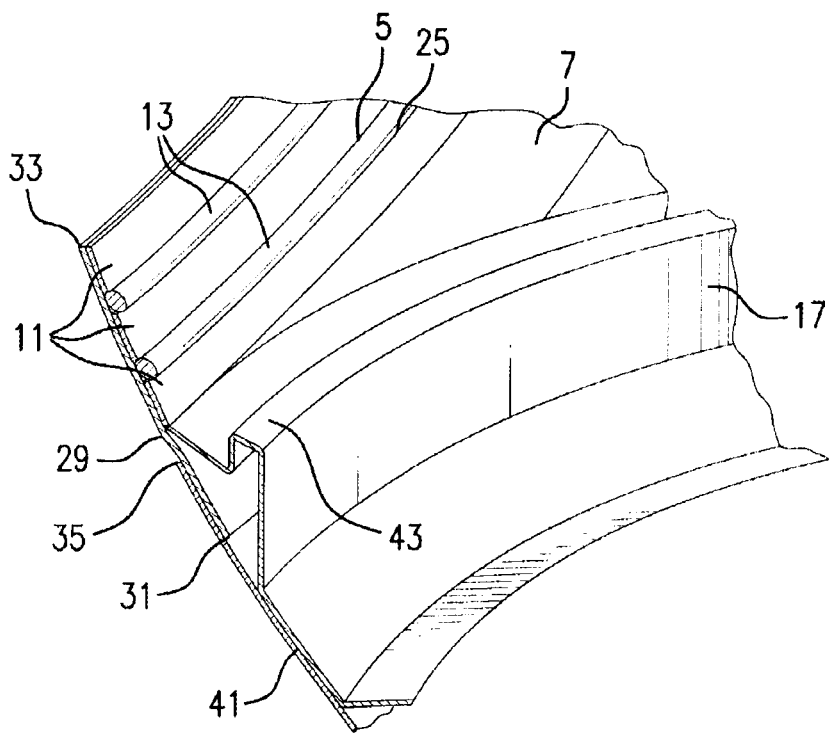
FIG. 9B shows a fragmentary perspective view of a lower track flushing to a bezel ring with strip seals and bead seals according to the present invention.

Referring to FIGS. 8B and 9B, in a more preferred embodiment, for faster formation of an airtight engagement between a door (19) and the retaining surface (25), a bead seal (13) is seated between two strip seals (11). The bead seal (13) typically runs continuous along the lengths of the strip seals (11) between which it is seated. In its seated position between two strip seals, the bead seal (13) circumscribes the doorway opening (9). As with the strip seal (11), the bead seal (13) is made from a non-porous, soft and deformable material such as natural rubber, synthetic styrene butadiene rubber and silicone. Silicone is a preferred material. Also as with the strip seal (11), for ease of manufacturing and installation, it is preferred that the bead seal (13) be comprised of a plurality of segments that are laid head-to-tail in a fashion as described above with respect to the strip seals.

Referring to FIGS. 8B and 9B, in a preferred embodiment of the invention utilizing a bezel ring (29), there are three concentric strip seals (11) mounted on the retaining surface (25) of the bezel ring (29) that circumscribe the minor opening of the bezel ring (29). Bead seals (13) are seated between adjacent strip seals (11). When the door (19) is positioned opposite the minor opening of the bezel ring (29) (i.e., the doorway opening (9)) and engaged to the retaining surface (25), the three strip seals (11) and two bead seals (13) function to form a hermetic seal for a pressurized condition of the vessel (3). As discussed above, three points of contact provide for a quicker hermetic engagement and a redundant fail safe back-up; nonetheless, one seal with one contact is sufficient.

Referring to FIGS. 1 and 3, there is a first track and a second track (15, 17) with a running surface (45). The pair of tracks (15, 17) are spaced apart, oppositely opposed and mounted to the vessel (3) in tangential proximity to the doorway opening (9). This pair of tracks (15, 17) is a path on which travels a door (19). Typically, the pressure vessel (3) is for human occupancy and has standardized orientation during normal operation so as to define and upper and lower whereby the one track (15) is an upper track and the other track is a lower track (17).

The tracks are made from metal, usually aluminum; polycarbonate; fiberglass and/or graphite composite polymers. Fiberglass is preferred because of its lightweight, strength and ease of configuring it in the below described fashion.

Referring to FIGS. 3, 6, 8A and 9A, the tracks (15, 17) are tangentially mounted to the vessel so that they approximately touch at diametric opposite points the peripheral or marginal edge of the doorway opening. The tracks (15, 17) can have a bonding flange (41) for attachment to the pressure vessel (3) and typically, for attachment to the internal side (7) of the pressure vessel wall (21). Preferably, the bonding flange (41) runs the length of the track (15, 17) and laps onto the internal side (7) of the pressure vessel wall (21) for mounting the track (15, 17) to the pressure vessel (3). Alternatively, flanges, brackets and/or support post can be used. Typically, the mounting of the track (15, 17) is done with cement or glue. Alternatively, in some embodiments, penetrating fasteners and/or wielding may be used.

Figure 6A:
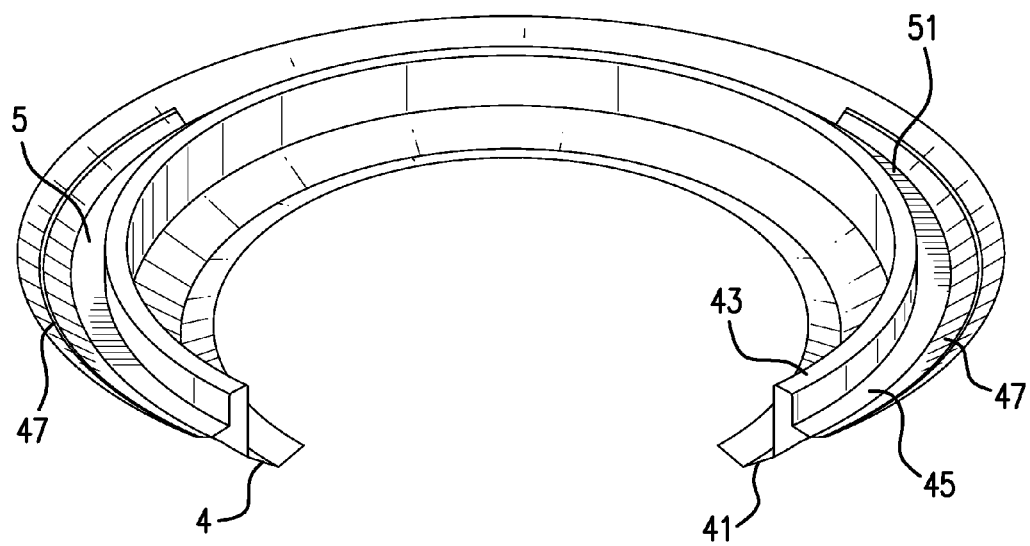
FIG. 6A shows a sectional perspective view of a track according to the present invention.
Figure 6B:
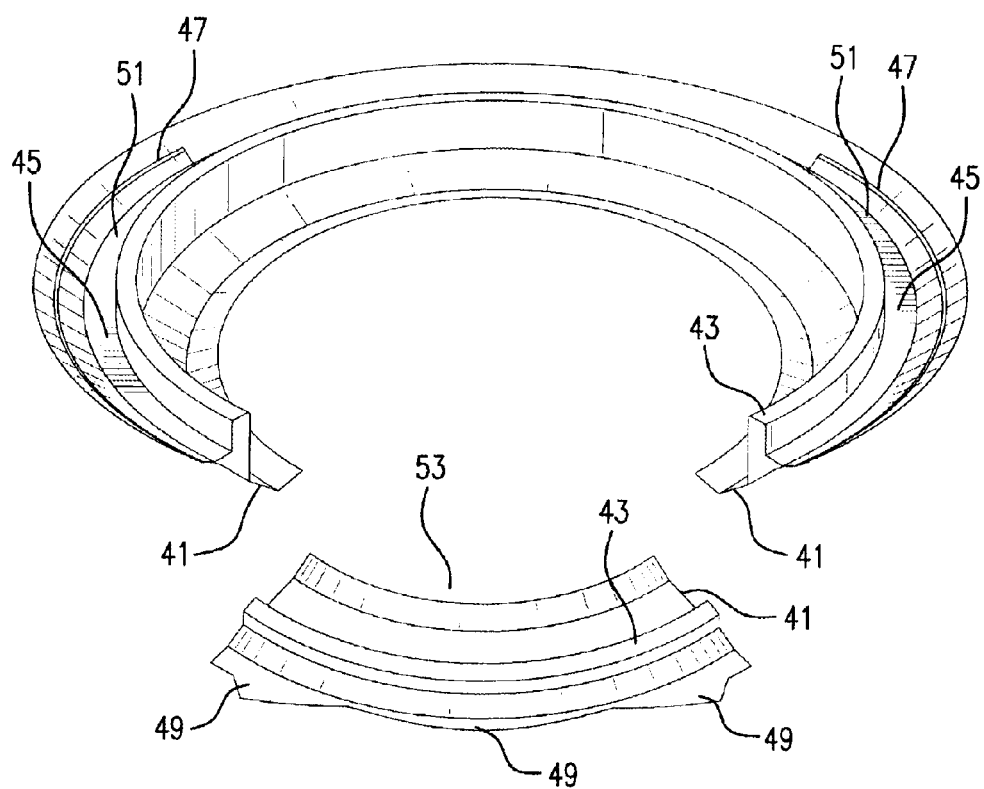
FIG. 6B shows a diagrammatic perspective view of a track according to the present invention.
Figure 6C:
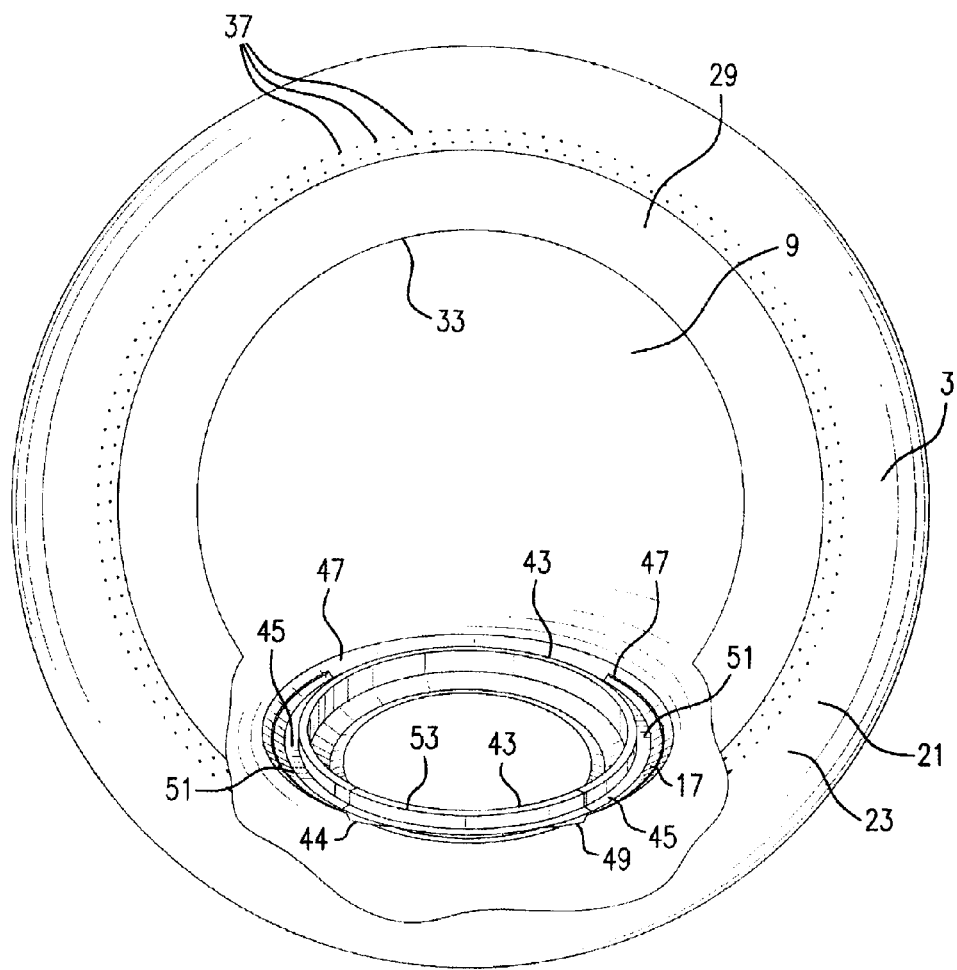
FIG. 6C shows a fragmentary perspective view of a track mounted to a pressure vessel according to the present invention.
Figure 11:
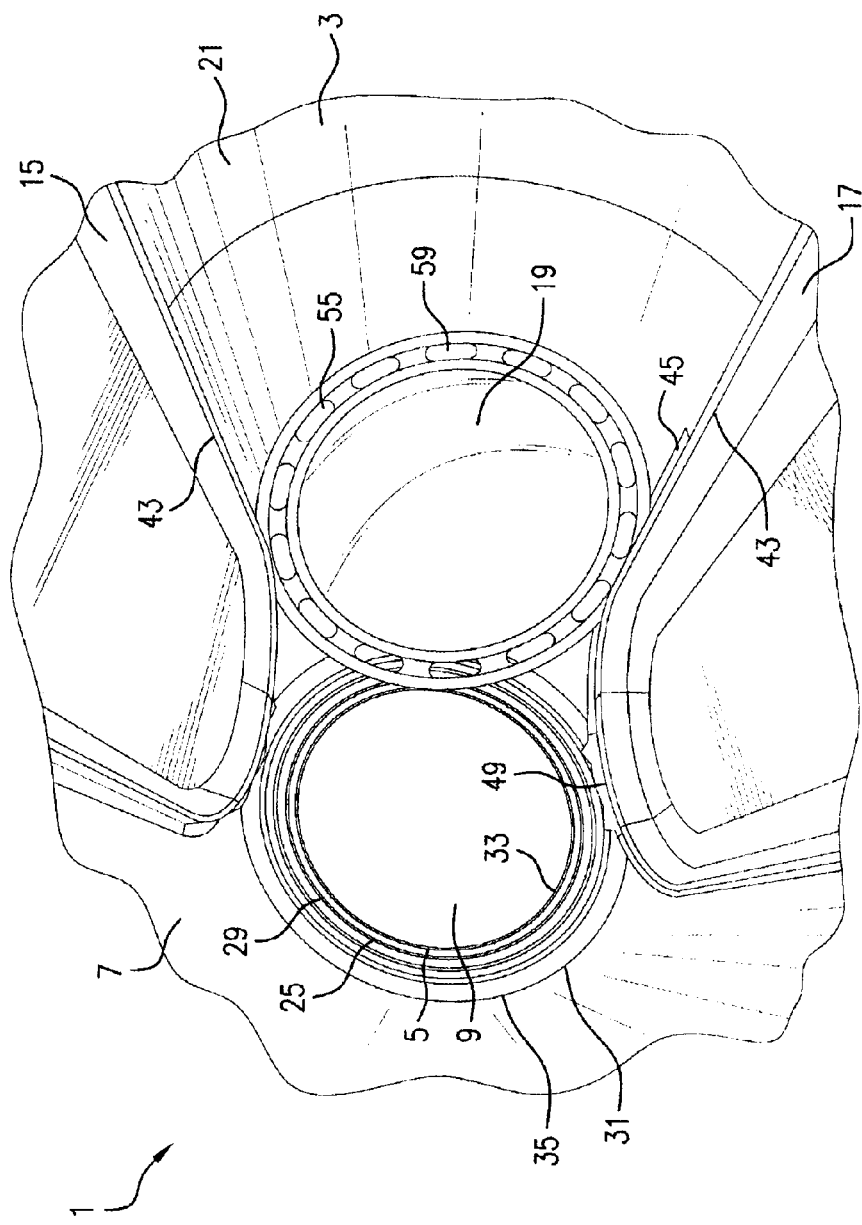
FIG. 11 shows an elevated perspective view of an alternative embodiment of a hingeless door according to the present invention and FIG. 12 shows an elevated perspective view of an alternative embodiment of a hingeless door according to the present invention.
Figure 12:
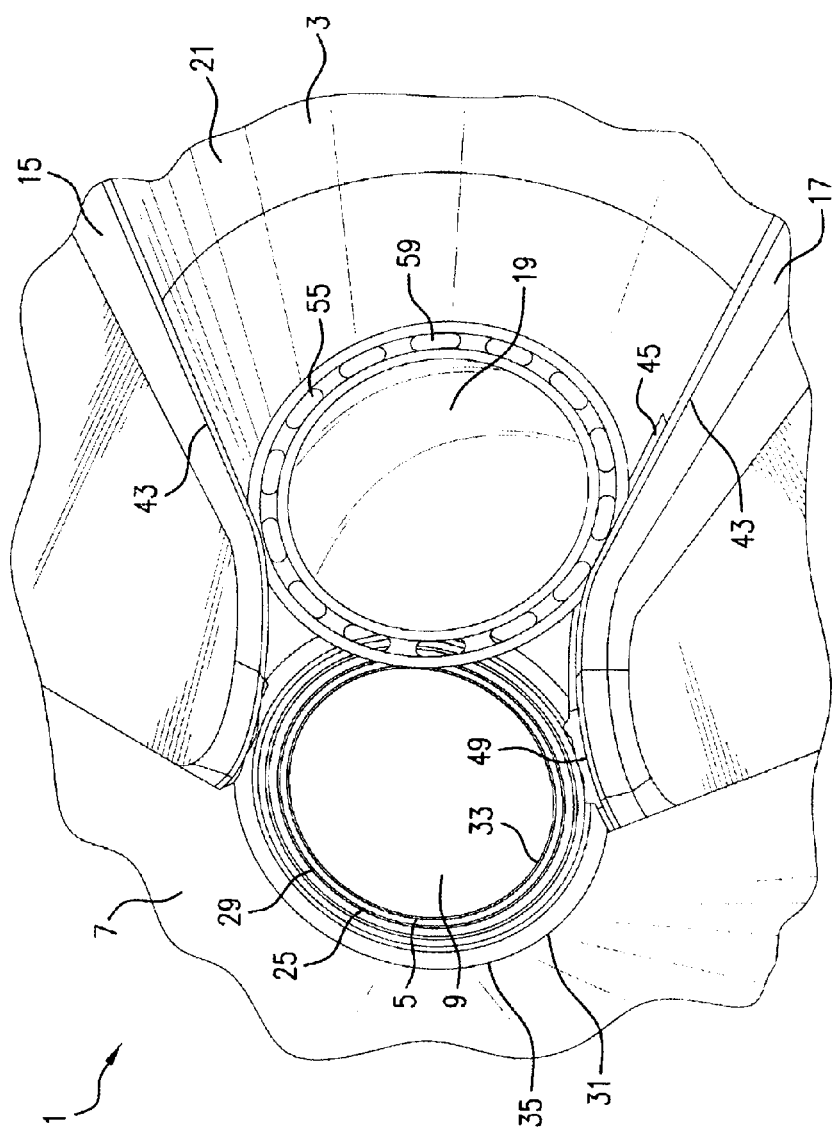

Continuing to refer to FIGS. 6A, 6B and 6C, the tracks (15, 17) have an inner guide wall (43). There is a running surface (45) which mates to the inner guide wall (43). Referring to FIGS. 10D, 11 and 12, the track (15, 17) can mounted to vessel (3) so that the open outer edge of the running surface (45) is positioned adjacent to the internal side (7) of the vessel wall (21) so as to be in proximal relation with the vessel wall (21). Accordingly, the internal side (7) of the vessel wall (21) functions as an outer guide wall that opposes the inner guide wall (43) to form a pseudo-channel. The width of this pseudo-channel conforms to slidingly or rollingly receiving a member of the door (19), usually the door edge (39), for running in the pseudo-channel.

Referring to FIGS. 6A, 6B and 6C, in a preferred embodiment, the track (15, 17) has an outer guide wall (47) which mates with a running surface (45) other than where the running surface is adapted to extend outward with an outward extension (49) to flush with the retaining surface (25)(discussed below.) The inner guide wall (43) and outer guide wall (47) are oppositely opposed to form a channel (51). Commensurately as discussed above regarding the pseudo-channel (51), the channel has a width that conforms to slidingly or rollingly receiving a member of the door (19), usually the door edge (39), for running in the channel (51).

Continuing to refer to FIGS. 6B, 6C and 7, as mentioned above, a section of the running surface (45) that is opposite the doorway opening (9) is adapted to extend outward (49) to approximately flush with the retaining surface (25). Referring to FIGS. 10B and 10C, the door (19) can move radial on the outward extension (49) between a door closed sealed position (FIG. 10B) and a door openable unsealed position (FIG. 10C). The outward extension (49) can be an one eighth inch or less in length. It is within the purview of the invention that outward extension (49) can also be a contour, contact point, relief or cut-out in the runner surface (45) that flushes with the retaining surface such that the door can move radially against the retaining surface (25).

The portion of the extension that flushes with the retaining surface (25) can lap over or lap under the seal (11, 13). It is preferred that the extension lap under the seal (11, 13). Referring to FIG. 6B, in a preferred embodiment, the section of the track having a running surface adapted to extend outward (49) to be approximately flushable with the retaining surface is a separate extension member (53) that is mounted to the remainder of the track (15, 17)

Figure 10A:
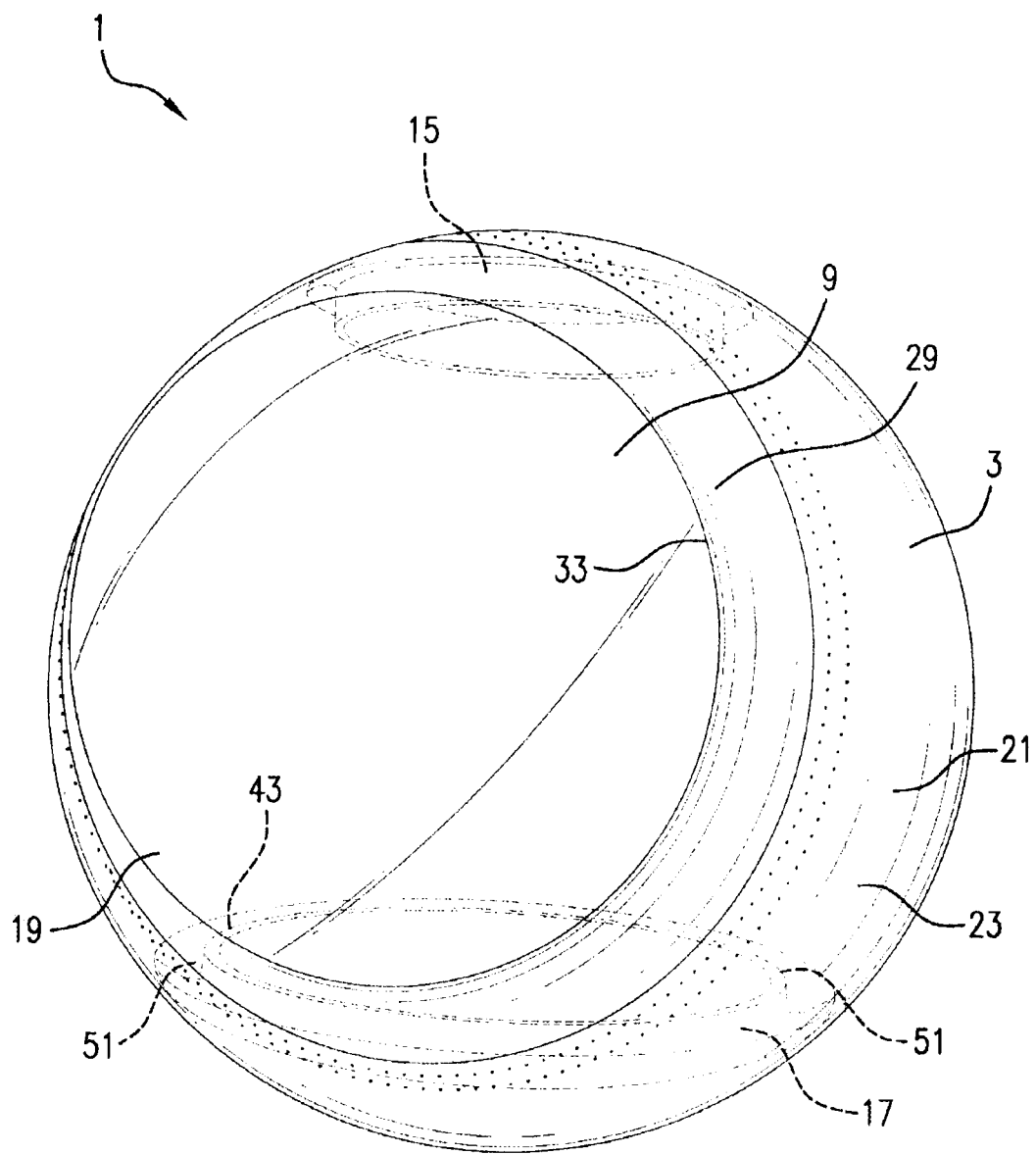
FIGS. 10A to 10F show a series of diagrammatic perspective and fragmentary perspective views illustrating the operation of the hingeless door system according to the present invention where
Figure 10B:
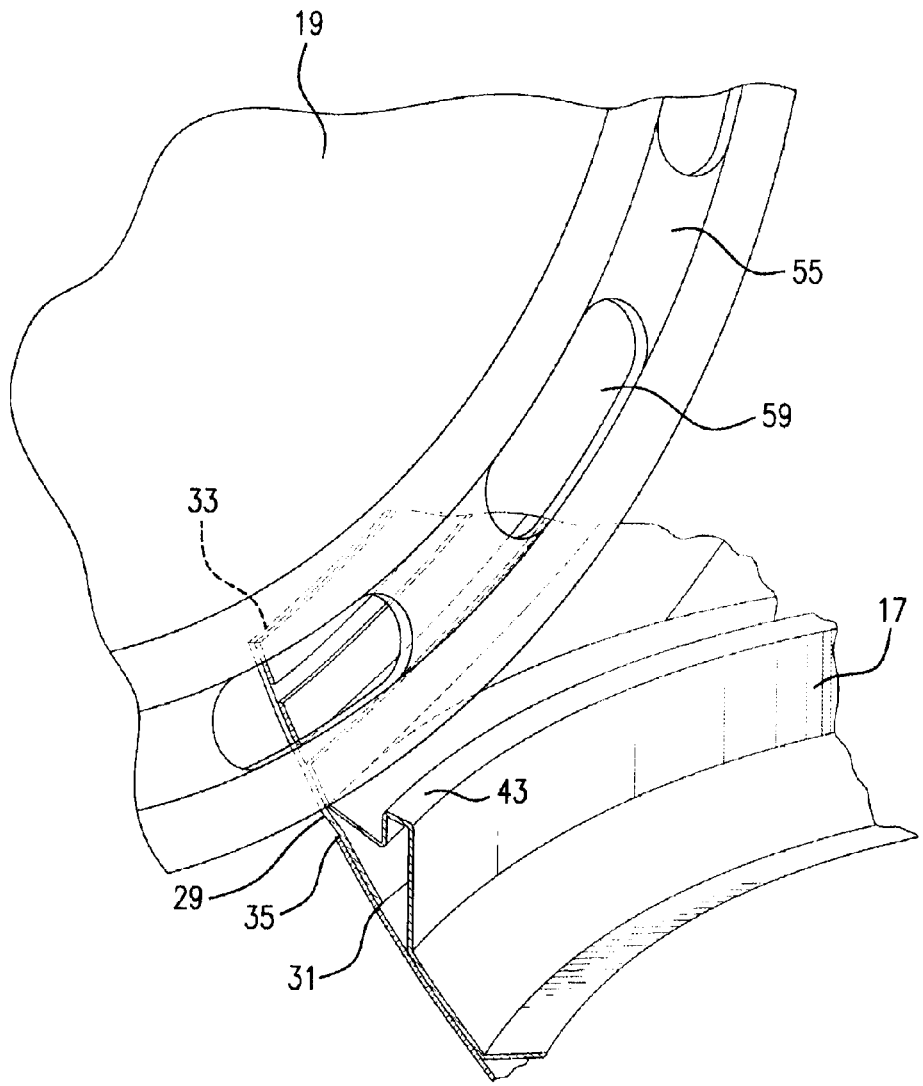
Figure 10C:
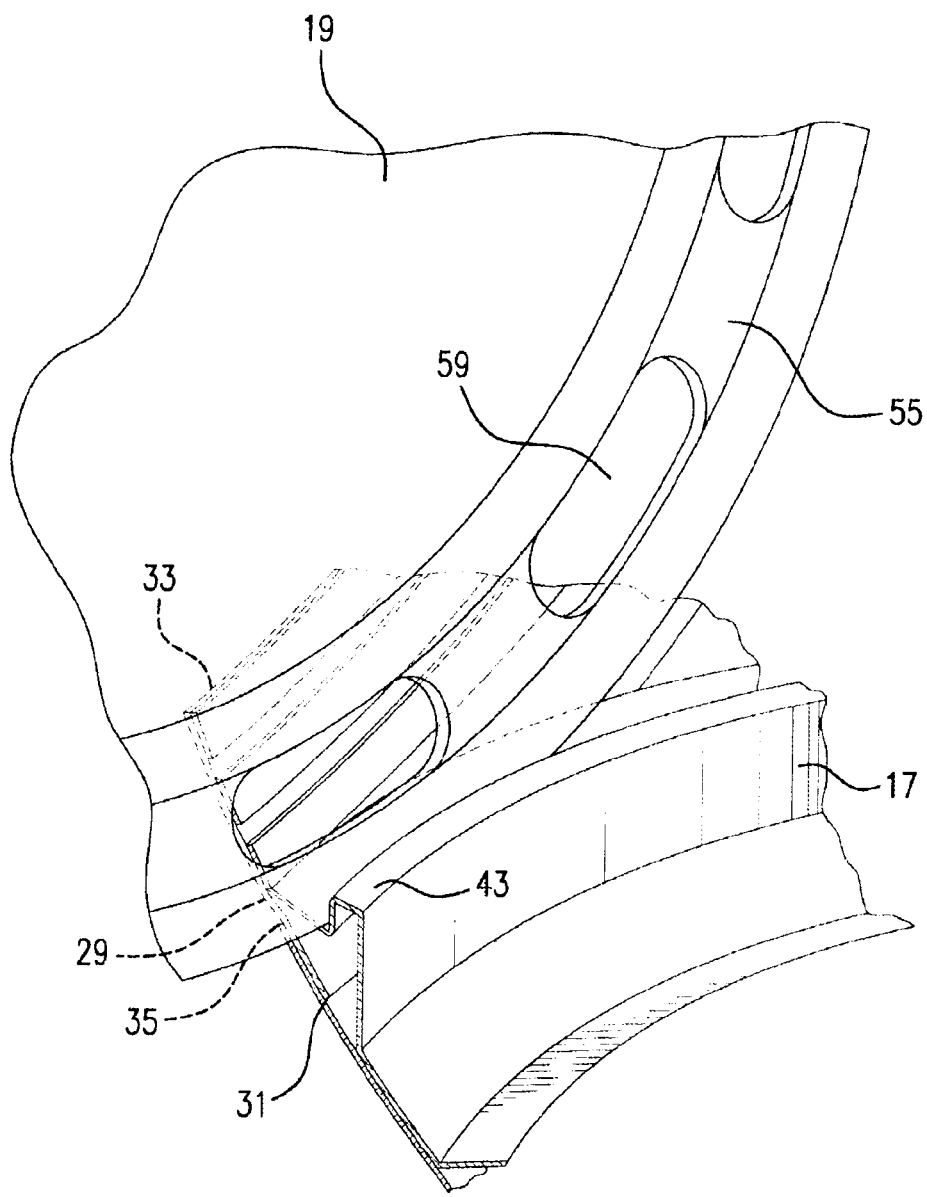
Figure 10D:
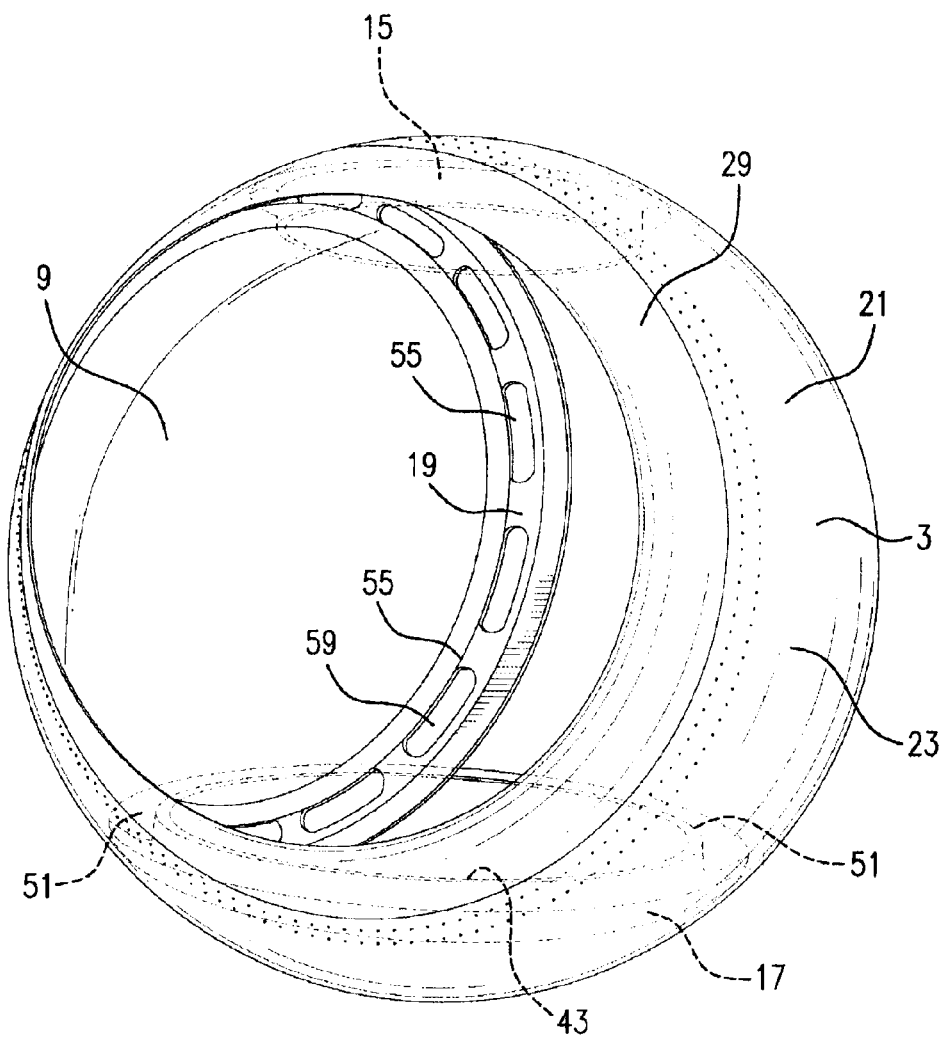
Figure 10E:
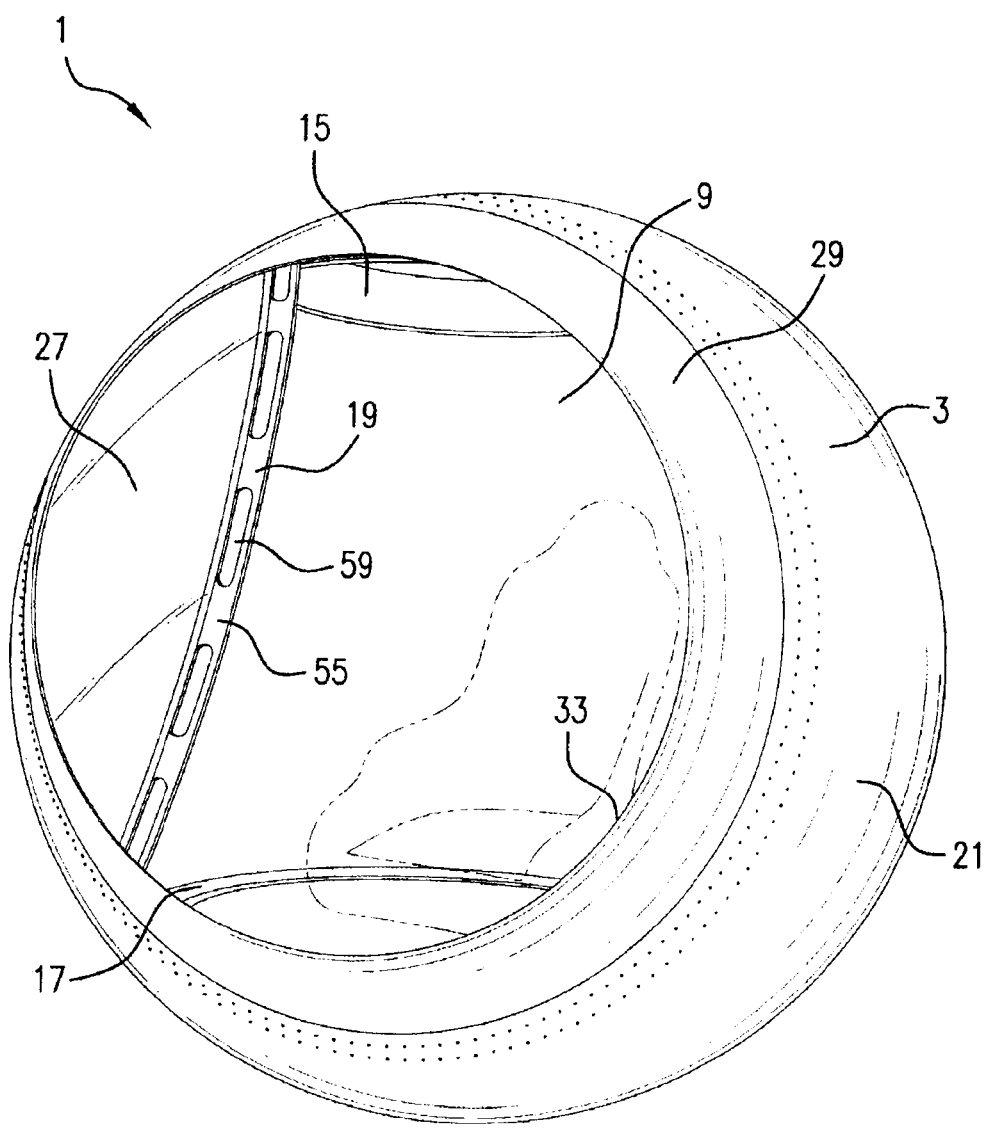
Figure 10F:
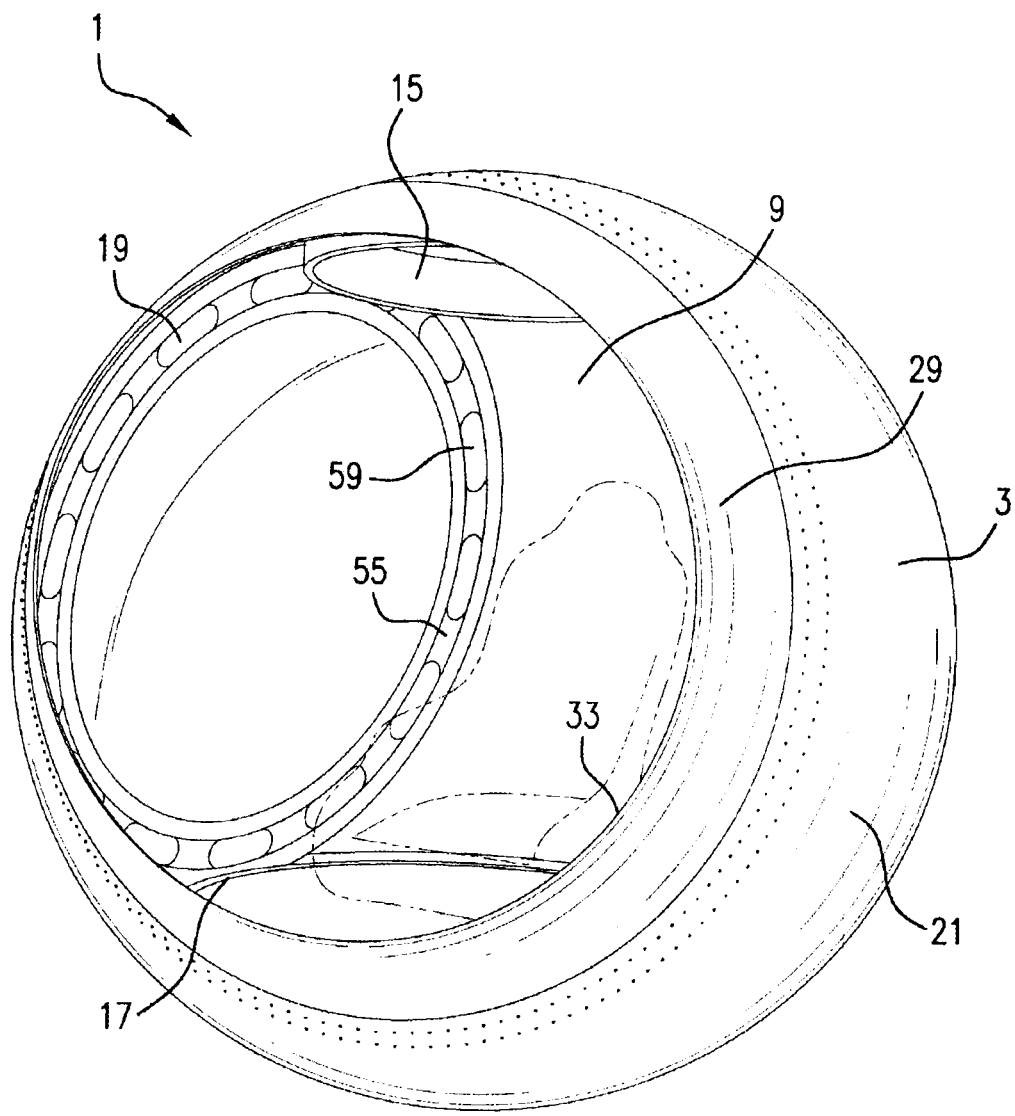

Referring to FIGS. 10C-F, the track (15, 17) is of sufficient length such that a door (19) can move transversely between a door openable unsealed position (FIG. 10C), through a range of motion (FIGS. 10E and E) to an door open ingressable-egressable position (FIG. 10F).

Referring to FIGS. 6 through 10, in a preferred embodiment, the tracks (15, 17) are arcuate. In an alternative embodiment with arcuate tracks (15, 17), the radius of the arcuate tracks is about the same such that a door (19) mounted in the tracks (15, 17) will be substantially parallel to the doorway opening (9). In other alternative embodiments, the radius of one arcuate track (15, 17) is greater than the radius of the other arcuate track (15, 17). Where an upper track (15) has a radius greater than a lower track (17), the door (19) will angle outward towards the doorway opening (9). Where an upper track (15) has radius less than a lower track (17), the door (19) will angle inward away from the doorway opening (9).

Referring to FIGS. 11 and 12, in alternative embodiments, the tracks (15, 17) can be approximately a rounded "L" configured or hook configured, "U" configured, semi-circular and other configurations. Where the pressure vessel (3) is a spherical container, than tracks (15, 17) that are 360 degree orbit tracks are preferred.

Optionally, there can be one or more stoppers (not illustrated) seated on and/or in the running surface (45), channel (51) and/or pseudo-channel (51), or hinged stoppers that rotate in and out of such a position, to restrict and/or assist in the positioning of a door (19) which moves laterally. Optionally, the running surface (45), channel (51) and/or pseudo-channel can be coated or treated with a lubricant; for example, grease.

Referring to FIGS. 5A, 5B and 7, as mentioned above, there is a door (19). The door (19) has an exterior surface (27) with spatial attributes that conforms to the retaining surface (25) and an outer edge (39). Accordingly, the door (19) is hermetically engagable to the retaining surface (25) with the assistance of the seal (11, 13). The door (19) has one or more members that are capable of running along the running surface (45) and moving radially on the running surface outward extension (49). The member can be a bearing, wheel or caster attached via an extension member, frame, leg, linkage, post and/or support. The member can be the edge of the door (19) with or without a lubricant. Preferably, the member is the edge of the door (19).

Referring to FIGS. 1, 3 and 10D-F, the door (19) is movably mounted between the running surfaces (45) on the opposing tracks (15,17) by the member or members being placed and/or inserted onto/into the running surface (45), pseudo channel (51) or channel (51).

Referring to FIGS. 5A and B, in a preferred embodiment, the door (19) is circular and has an exterior surface (27) with convex-like spatial attributes and accordingly, conforms to a concave-like retaining surface (25) for reception therein. The door (19) is movably mounted between the opposing tracks (15, 17) by the rounded perimeter (27) of the door (19) being placed/inserted unto/into the running surface (45), pseudo channel or channel (51). Referring to FIGS. 10D-F, the circular door (19) runs laterally on the running surfaces (45) by rolling or sliding with rolling preferable. The circular door (19) runs radially on the running surface extension by sliding.

In a preferred embodiment, a handle or handles (55) are mounted to the internal surface (57) of the door (19) that are a grasp for moving the door (19) radially and laterally. In a more preferred embodiment, the door (19) is a circular door with an annular handle (55) having a plurality handhold cutouts (59) with the handle mounted near the perimeter of the internal surface (57) of the door (19).

Embodiments of this invention are kits comprised of the above mentioned components of a hingeless door system (1) for installation into a pressure vessel (3).

Referring to FIGS. 10A to F, the method of operation of the hingeless door system is a follows. The doorway (9) is an ingress and egress for an occupant (or thing) of the pressure vessel. The hingeless door system can be operated manually by an occupant to an open ingressable-egressable position and a closed sealed position within the doorway (9) by adjusting the position of the door (19). It is within the purview of the invention of outfitting the hingless door system (1) with a mechanical mechanism that automates the adjustment of the door from an open ingressable-egressable position to a closed sealed position in the doorway. The discussion that follows is in terms of manual operation and is relatable to automated operation.

For this discussion, by way of example, the scenario begins with an intended occupant outside the pressure vessel with the doorway (9) open (see, FIG. 10F.) The occupant enters the pressure vessel (3). The occupant then grasps the door (19), preferably by a handle (55) on the inside surface of the door (19). The occupant than uses a sliding or rolling motion to move the door (19) opposite the doorway opening (9) (see, FIGS. 10E-C). Where the door (19) is a circular door (19), it is preferred that door be rotated into a position opposite the doorway opening (9). The door (19) runs along the opposing tracks (15, 17) and the door does not require lifting into place.

Referring to FIGS. 10A-C, next the door (19) is moved radially outward to engage the receiving surface (5) of the doorway opening (9). Again, this can be accomplished either manual or automatically. For the purpose of the discussion herein, the closing is illustrated manually. It is understood that this can be similarly done with an automated mechanism. The occupant moves the door radially by pushing or kicking the door (19) against the retaining surface (25) so that it is received-against the seal (11, 13) surrounding the doorway opening (9). In so doing, the door (19) runs radially on the opposing tracks (15, 17)

Next, pressure is selectively changed within the pressure vessel (3). The internal pressure is made higher than the pressure outside the pressure vessel (3) which causes the door (19) to be retained over the doorway opening (9) with a hermetic seal. The door (19) is typically held in position with the slightest pressure; that is, one pound per square inch (1 psi) can hold the door closed and against the seal.

Referring to FIGS. 10A-F, to open the doorway (9), there is a release pressure inside the pressure vessel (3) to equilibrate the internal pressure with that of the ambient environment around the pressure vessel (3). This releases the door (19) from its hermetic seal. The occupant pulls the door (19) outward and does so preferably using a handle (55) on inside surface (57) of the door (19). The door (19) runs radially on the outward extensions (49) of opposing tracks (15, 17). The occupant than moves the door lateral along the opposing tracks (15, 17), and in the case of a circular door by preferably rotating, away from the doorway opening (9) so as to clear the doorway opening (9). Accordingly, the occupant (or thing) can access to the outside of the pressure vessel (3).

The previously described versions of the present invention have many advantages. One advantage is that there is no hinge system which in turn reduces the space (volume) required for operation. That is, no space in the pressure vessel is reserved or taken-up for a swing-in/swing-out of the door; rather, the door slides in and out of position by movement proximal to the wall of the pressure vessel. Another advantage is no hinge system, latching hardware and/or locking devices that add significant weight to the pressure vessel. Instead, there are the tracks made out of a lightweight material. Another advantage is that the hingeless door system is simple and inexpensive to construct, build, operate and maintain. Other advantages are that the hingeless door system is strong, tough, resistant to rupture, resistant to strain and resistant to failure.

EXAMPLES

The following examples further describe and demonstrate embodiments within the scope of the present invention. The examples are given solely for the purpose of illustration and are not to be construed as limitations or restrictions of the present invention, as persons skilled in the art will quickly realize many variations thereof are possible that are all within the spirit and scope of the invention.

Example 1

Example 1 is an example of a pressure vessel that is outfitted as a space capsule. The pressure vessel was a hollow spherical container that was suitable for occupancy by one person. The diameter of the spherical container was about 6 feet. A hole was formed in wall of the spherical container to which was mounted a bezel ring. The inner opening of the bezel ring was about 4 feet in diameter. This spherical container was mounted into a foam-insulated molded fiberglass skin which was epoxy painted with fireproof paint having the shape of a space capsule with a nose cone and a base crash pad/heat shield. There was a cage that surrounded the spherical container that supported the capsule overall that was made from welded chromium molybdenum aircraft tubing. The space between spherical container and fiberglass skin was used to house equipment such as liquid oxygen and nitrogen tanks. There was an external control to actuate pressurization and an internal control to depressurize so as to release the hingeless door for opening. Overall, the capsule was about 11 feet high and had a base diameter of about 8 feet.

Example 2

Example 2 is the capsule of Example 1 where the hollow spherical container had a diameter of about 72 inches. There was an opening of about 52.89 inches in diameter that received a bezel ring. The bezel ring had a major opening having a diameter of about 52.89 inches and a minor opening having a diameter of about 44.06 inches. An upper track was mounted to the internal side of the vessel wall via a bonding flange. The upper track had an orbital track having an outer diameter of the running surface of about 33.59 inches and an inner diameter of the running surface of about 29.90 inches. A lower track was mounted to the internal side of the vessel wall via a bonding flange. The lower track was an orbital track having an outer diameter of the running surface of about 59.65 inches and an inner diameter of the running surface of about 55.51 inches.

Example 3

The capsule of Example 2 was tested under real flight conditions with the spherical container pressurized. There was a launch from a site at Roswell, N. Mex., USA. The capsule was buoyed by a helium high altitude stratospheric balloon to an altitude that reached 71,581 feet. The hingeless door system operated successfully.

Example 4

The capsule of Example 2 was pressurized and chamber tested under at a Brooks-City Base in San Antonio, Tex. The capsule, and concomitantly, the door system, was exposed to simulated the extreme conditions (e.g., high wind simulation, temperatures near −70° Fahrenheit (−56.7 Celsius)) that would be faced in the environs of stratospheric accent. The hingeless door system was confirmed appropriate for human transport to 121,000 feet.

Example 5

The capsule of Example 2 was buoyed by a helium high altitude stratospheric balloon to the edge of space with an ascent to about 120,000 feet. The spherical container was pressurized to about 8 pounds per square inch (psi), the equivalent to 16,000 feet above sea level. The hingeless door system successfully passed through the operation.

Although the present invention has been described in considerable detail with reference to certain preferred versions thereof, other versions are possible with substituted, varied and/or modified materials and steps are employed. These other versions do not depart from the invention. Therefore, the spirit and scope of the appended claims should not be limited to the description of the preferred versions contained herein.

What is claimed is:

1. A hingeless door system for a pressure vessel having a wall that partitions a pressurizable internal space from an external environment comprised of:
   a. a contour in the wall on the internal side of the vessel wall that forms a retaining surface capable of conformingly receiving an exterior engaging surface of a door;
   b. a doorway opening that goes through the retaining surface and wall to allow for passage between the internal space and the external environment;
   c. a pair of spaced-apart, oppositely opposed tracks mounted to the pressure vessel in tangential proximity to the doorway opening, where each of said tracks is comprised of:
      i. an inner guide wall;
      ii. a running surface which mates to the inner guide wall with a section of said running surface opposite the doorway opening having an outward extension adapted to be approximately flush with the retaining surface such that a door can move radially on the outward extension between a sealed position and an unsealed position, where the track is of sufficient length such that a door can move transversely between an unsealed position and an ingressable-egressable door position;
      iii. an outer guide wall which mates with the running surface other than at the outward extension such that the inner guide wall and outer guide wall are oppositely opposed to form a channel and
   d. a door delimited by an outer edge that has an exterior engaging surface that conforms to the retaining surface and has at least one member with the capabilities of running along the running surfaces and moving radially on the outward extension that is movably mounted between the running surfaces on the opposing tracks; and
   e. a seal having a mounting selected from the group consisting of a mounting on the retaining surface that circumscribes the doorway opening and a mounting on the exterior engaging surface of the door delimited by the outer edge, so as to be capable of forming an airtight engagement with an exterior engaging surface of a door.

2. The hingeless door system of claim 1 where the section of the track having an outward extension is a separate extension member that is mounted to the remainder of the track.

3. The hingeless door system of claim 1 where the seal is a strip seal with there being a plurality of strip seals mounted on the retaining surface in a spaced-apart arrangement that circumscribes the doorway opening.

4. The hingeless door system of claim 3 further comprising a bead seal that is seated between two strip seals.

5. The hingeless door system of claim 1 where elements a and b are disposed in a bezel ring wall extender having a major opening and a minor opening that is mounted at the major opening to the doorway opening whereby the minor opening becomes the doorway opening.

6. A hingeless door system for a pressure vessel having a wall that partitions a pressurizable internal space from an external environment comprised of:
   a. a contour in the internal side of the vessel wall that forms a retaining surface having a concave-like configuration capable of conformingly receiving an exterior engaging surface having a convex-like configuration of a door;
   b. a circular doorway opening that goes through the retaining surface and wall to allow for passage between the internal space and the external environment;
   c. a strip seal mounted to the retaining surface that circumscribes the doorway opening so as to be capable of forming an airtight engagement with an exterior engaging surface having a convex-like configuration of a door;
   d. a pair of oppositely opposed arcuate tracks mounted to the pressure vessel in diametrically spaced apart parallel arrangement in tangential proximity to the doorway opening, where each of said tracks is comprised of:
      i. an inner guide wall;
      ii. a running surface which mates to the inner guide wall having an outward extension adapted to be approximately flush with the retaining surface having a concave-like configuration such that a door can move radially on the outward extension between a sealed position and an unsealed position, where the track is of sufficient length such that a door can move transversely between an unsealed position and an ingressable-egressable position;
      iii. an outer guide wall which mates with the running surface other than at the outward extension such that the inner guide wall and outer guide wall are oppositely opposed to form a channel and
   e. a circular door delimited by a rounded outer edge that has an exterior engaging surface having a convex-like configuration that conforms to the retaining surface having a concave-like configuration that hermetically engages the strip seal where the circular door is movably mounted between the running surfaces on the opposing tracks such that the rounded outer edge runs on the running surface and moves radially on the outward extension,
   whereby when the circular door is in the sealed position and the internal space is pressurized, the exterior engaging surface having a convex-like configuration of the circular door hermetically seals against the strip seal and the circular door remains in said place so long as the internal space is pressurized.

7. The hingeless door system of claim 6 where the section of the track having an outward extension is a separate extension member that is mounted to the remainder of the track.

8. The hingeless door system of claim 6 with there being a plurality of strip seals mounted on the retaining surface having a concave-like configuration in a spaced-apart arrangement that circumscribes the doorway opening.

9. The hingeless door system of claim 8 further comprising a bead seal that is seated between two strip seals.

10. The hingeless door system of claim 6 where elements a and b are disposed in a bezel ring wall extender having a major opening and a minor opening that is mounted at the major opening to the doorway opening whereby the minor opening becomes the doorway opening.

11. A hingeless door system for a pressure vessel having a wall that partitions a pressurizable internal space from an external environment comprised of:
   a. a contour in the wall on the internal side of the vessel wall that forms a retaining surface having a concave-like configuration capable of conformingly receiving an exterior engaging surface having a convex-like configuration of a door;
   b. a circular doorway opening that goes through the retaining surface and wall to allow for passage between the internal space and the external environment;
   c. a strip seal mounted to the retaining surface that circumscribes the doorway opening so as to be capable of forming an airtight engagement with an exterior engaging surface having a convex-like configuration of a door; and
   d. a pair of oppositely opposed arcuate tracks mounted to the vessel in a diametrically spaced-apart parallel arrangement in tangential proximity to the doorway opening, where each of said tracks is comprised of:
      i. an inner guide wall;
      ii. a running surface which mates to the inner guide wall;
      iii. outward extension adapted to be approximately flush with the retaining surface such that a door can move radially on the outward extension between a sealed position and an unsealed position;
      iv. an outer guide wall which mates with the running surface other than at the outward extension such that the inner guide wall and outer guide wall are oppositely opposed to form a channel, where the track is of sufficient length such that a door can move transversely between an unsealed position and an ingressable-egressable position; and
   e. a circular door delimited by a rounded outer edge that has an exterior engaging surface having a convex-like configuration that conforms to the retaining surface having a concave-like configuration that hermetically engages the seal where the door is movably mounted between the running surfaces on the opposing tracks such that the rounded outer edge runs on the running surface and moves radially on the outward extension,
   whereby when the circular door is in the sealed position and the internal space is pressurized, the exterior engaging surface having a convex-like configuration of the circular door hermetically seals against the strip seal and the circular door remains in said place so long as the internal space is pressurized.

12. The hingeless door system of claim 11 where the radii of the arcuate tracks are about the same.

13. The hingeless door system of claim 11 where the radius of one arcuate track is greater than the radius of the other arcuate track.

14. The hingeless door system of claim 11 where the section of the track having an outward extension is a separate extension member that is mounted to the remainder of the track.

15. The hingeless door system of claim 11 with there being a plurality of strip seals mounted on the retaining surface in a spaced-apart arrangement that circumscribes the doorway opening.

16. The hingeless door system of claim 15 further comprising a bead seal that is seated between two strip seals.

17. The hingeless door system of claim 11 where elements a and b are disposed in a bezel ring wall extender having a major opening and a minor opening that is mounted at the major opening to the doorway opening whereby the minor opening becomes the doorway opening.

18. A hingeless door system kit for a pressure vessel having a wall with a doorway opening that is outfitable having a retaining surface and usable with a door with an exterior engaging surface comprised of:

a. a first track having a running surface, a first guide wall which mates to the running surface with a section of said running surface positionable opposite the doorway opening having an outward extension adapted to be approximately flush with the retaining surface, a second guide wall oppositely opposed to the first guide wall which mates to the running surface so as to form a channel which extends at least a portion of the length of the track other than at the outward extension where the track is of sufficient length for the movement of a door running along said running surface between an unsealed position alignable with the doorway opening and an ingressable-egressable position not aligned with the doorway opening;

b. a second track having a running surface, a first guide wall which mates to the running surface with a section of said running surface positionable opposite the doorway opening having an outward extension adapted to be approximately flush with the retaining surface, a second guide wall oppositely opposed to the first guide wall which mates to the running surface so as to form a channel which extends at least a portion of the length of the track other than at the outward extension where the track is of sufficient length for the movement of a door running along said running surface between an unsealed position alignable with the doorway opening and an ingressable-egressable position not aligned with the doorway opening; and c. a seal that is configurable to be mounted on a mounting selected from the group consisting of a mounting on a retaining surface with a doorway opening so as to circumscribe the doorway opening and a mounting on the exterior engaging surface of a door with an outer edge so as delimit the outer edge.

19. The hingeless door system kit of claim 18 where the section of the track having an outward extension is a separate extension member that is mountable to the remainder of the track.

20. The hingeless door system kit of claim 18 where the seal is a strip seal with there being a plurality of strip seals that are configurable to be concentrically mounted on the retaining surface so as to circumscribe the opening in said surface.

21. The hingeless door system kit of claim 20 further comprising a bead seal configurable to be seated between two strip seals.

22. The hingeless door system kit of claim 18 further comprising a bezel ring wall extender having a retaining surface, a major opening, and a minor opening that is mountable at the major opening to the doorway opening.

23. A hingeless door system kit for a pressure vessel having a wall with a doorway opening that is outfitable with a retaining surface having a concave-like configuration and usable with a door with an exterior engaging surface having a convex-like configuration comprised of:

a. a first arcuate track having a running surface, a first guide wall which mates to the running surface with a section of said running surface positionable opposite the doorway opening having an outward extension adapted to be approximately flush with the retaining surface having a concave-like configuration, a second guide wall oppositely opposed to the first guide wall which mates to the running surface so as to form a channel which extends at least a portion of the length of the track other than at the outward extension where the track is of sufficient length for the movement of a door running along said running surface between an unsealed position alignable with the doorway opening and an ingressable-egressable position not aligned with the doorway opening;

b. a second arcuate track having a running surface, a first guide wall which mates to the running surface with a section of said running surface positionable opposite the doorway opening having an outward extension adapted to be approximately flush with the retaining surface having a concave-like configuration, a second guide wall oppositely opposed to the first guide wall which mates to the running surface so as to form a channel which extends at least a portion of the length of the track other than at the outward extension where the track is of sufficient length for the movement of a door running along said running surface between an unsealed position alignable with the doorway opening and an ingressable-egressable position not aligned with the doorway opening; and c. a strip seal that is configurable to be mounted on a retaining surface having a concave-like configuration so as to circumscribe a doorway opening in said surface.

24. The hingeless door system kit of claim 23 where the section of the track having an outward extension is a separate extension member that is mountable to the remainder of the track.

25. The hingeless door system kit of claim 23 with there being a plurality of strip seals that are configurable to be concentrically mounted on a retaining surface having a concave-like configuration so as to circumscribe the opening in said surface.

26. The hingeless door system kit of claim 23 further comprising a bead seal configurable to be seated between two strip seals.

27. The hingeless door system kit of claim 23 further comprising a bezel ring wall extender having a retaining surface with a concave-like configuration, a major opening and a minor opening that is mountable at the major opening to the doorway opening.

28. A hingeless door system kit for a pressure vessel having a wall with a doorway opening that is outfitable with a retaining surface having a concave-like configuration comprised of:

a. a first arcuate track having a running surface with a section of said running surface positionable opposite the doorway opening having an outward extension adapted to be approximately flush with the retaining surface having a concave-like configuration, a first guide wall which mates to the running surface and a second guide wall oppositely opposed to the first guide wall which mates to the running surface other than at the outward extension so as to form a channel where the track is of sufficient length for the movement of a door running along said running surface between an unsealed position alignable with the doorway opening and an ingressable-egressable position not aligned with the doorway opening;

b. a second arcuate track having a running surface with a section of said running surface positionable opposite the doorway opening having an outward extension adapted to be approximately flush with the retaining surface having a concave-like configuration, a first guide wall which mates to the running surface and a second guide wall oppositely opposed to the first guide wall which mates to the running surface other than at the outward extension so as to form a channel where the track is of sufficient length for the movement of a door running along said running surface between an unsealed position alignable with the doorway opening and an ingressable-egressable position not aligned with the doorway opening; and c. a plurality of strip seals that are configurable to be mounted on the retaining surface having a concave-like configuration so as to circumscribe the doorway opening.

29. The hingeless door system kit of claim 28 where the section of the track having an outward extension is a separate extension member that is mountable to the remainder of the track.

30. The hingeless door system kit of claim 28 where the radius of the first arcuate track is about the same as the radius of the second arcuate track.

31. The hingeless door system kit of claim 28 where the radius of the first arcuate track is greater than the radius of the second arcuate track.

32. The hingeless door system kit of claim 28 further comprising a bead seal configurable to be seated between two strip seals.

33. The hingeless door system kit of claim 28 further comprising a bezel ring wall extender having a retaining surface that has a concave configuration, a major opening and a minor opening that is mountable at the major opening to the doorway opening.

34. The hingeless door system kit of claim 28 further comprising a door that has circular shape and exterior engaging surface that has a convex-like configuration for conformingly contacting the retaining surface having a concave-like configuration.

* * * * *